(12) United States Patent
Silver et al.

(10) Patent No.: US 12,450,243 B1
(45) Date of Patent: Oct. 21, 2025

(54) SYSTEMS AND METHODS FOR SEARCHING AND STORING DATA OVER A COMPUTER NETWORK

(71) Applicant: Citibank, N.A., New York, NY (US)

(72) Inventors: Miriam Silver, Tel Aviv (IL); Nimrod Barak, New York, NY (US); Prag Sharma, New York, NY (US); Avi Gefen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/204,415

(22) Filed: May 9, 2025

Related U.S. Application Data

(63) Continuation-in-part of application No. 18/544,303, filed on Dec. 18, 2023, now Pat. No. 12,340,194.

(51) Int. Cl.
*G06F 16/2458* (2019.01)
*G06F 16/242* (2019.01)

(52) U.S. Cl.
CPC ...... *G06F 16/2458* (2019.01); *G06F 16/2428* (2019.01)

(58) Field of Classification Search
None
See application file for complete search history.

(56) References Cited

U.S. PATENT DOCUMENTS

| | | | |
|---|---|---|---|
| 2021/0303989 A1* | 9/2021 | Bird | G06F 16/95 |
| 2022/0374212 A1* | 11/2022 | Abdelaziz | G06F 16/9024 |
| 2024/0272886 A1* | 8/2024 | Choudhury | G06F 16/23 |
| 2024/0281222 A1* | 8/2024 | Trummer | G06F 16/95 |
| 2024/0378399 A1* | 11/2024 | Gandhi | G06F 16/345 |

* cited by examiner

*Primary Examiner* — Son T Hoang
(74) *Attorney, Agent, or Firm* — Foley & Lardner LLP

(57) ABSTRACT

Systems and methods for streamlining risk modeling in software development using natively sourced kernels are described. The system may receive a native kernel for the first model, wherein the native kernel comprises a native code sample and a native description of the native code sample. The system may input the native code sample into an artificial intelligence model to generate a first output. The system may filter the first output based on the native description to generate a first validation assessment for the first model. The system may generate for display, in the user interface, the first validation assessment.

20 Claims, 10 Drawing Sheets

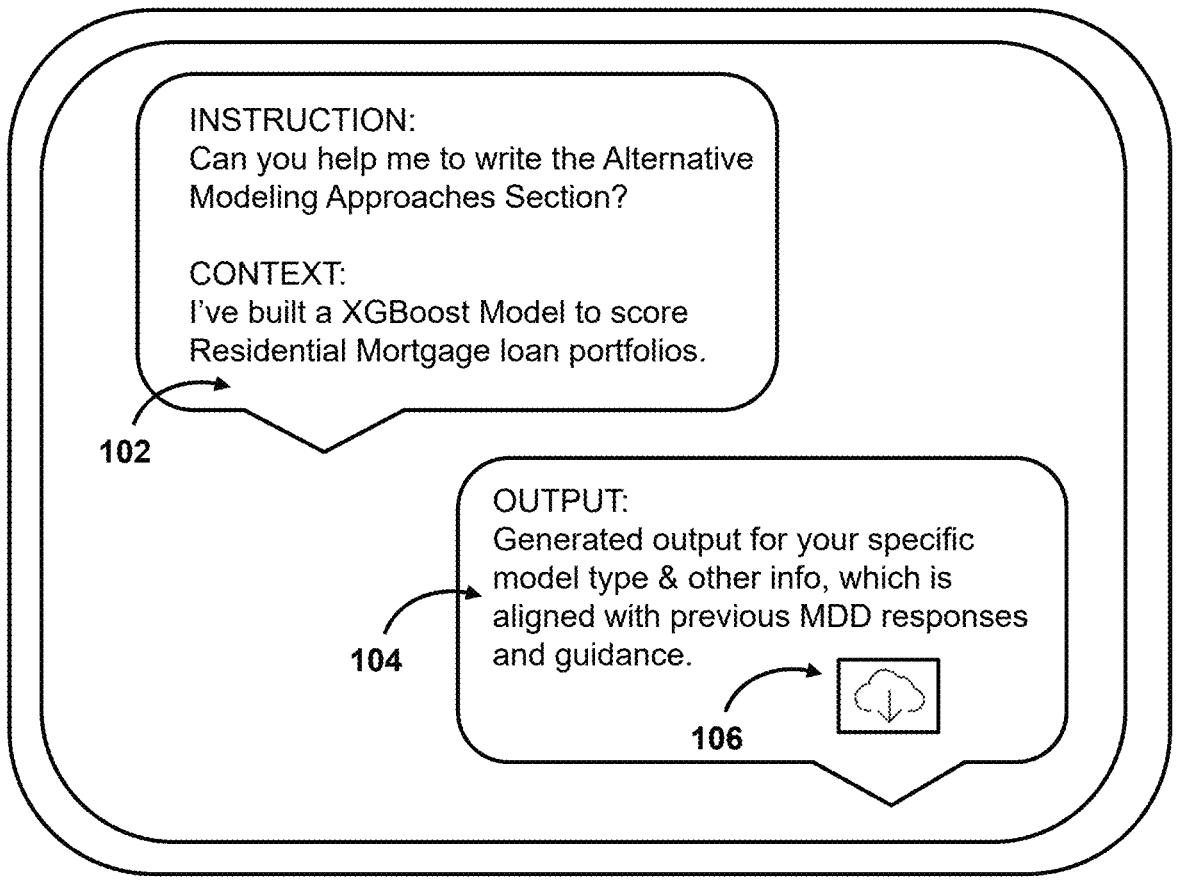
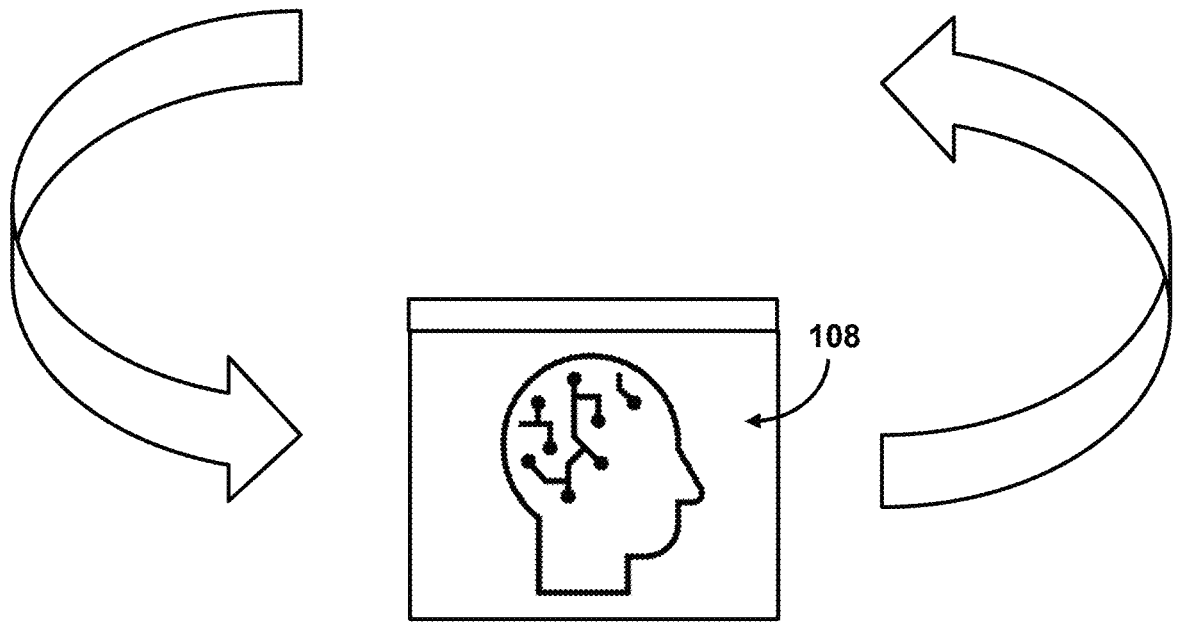
FIG. 1A

210

```
from sklearn.linear_model import LogisticRegression
# Customer Churn Prediction Model
class CustomerChurnPredictionModel:
    def __init__(self, X_train, y_train):
        self.model = LogisticRegression()
        self.model.fit(X_train, y_train)
    def predict(self, X):
        return self.model.predict_proba(X)[:, 1]
# Load the training data
X_train = pd.read_csv('customer_churn_training_data.csv')
...
recall = np.mean(y_pred[y_test == 1] == 1)
```

The purpose of the model is to predict which customers are likely to churn, or cancel their service, in the next 6 months. The model takes as input a variety of customer data, including demographics, account history, and product usage patterns. The model outputs a probability score for each customer, indicating the likelihood that they will churn. The model's performance metrics include accuracy, precision, recall, and F1 score.

This model is a logistic regression model that is trained to predict the likelihood of a customer churning. The model takes as input customer demographics, customer usage data, and customer satisfaction data. The model outputs a probability score that indicates the likelihood of the customer churning...
The model was trained on ...

Model Inputs: ... Customer satisfaction data (e.g., customer survey scores, support tickets)

Model Performance Metrics:...Recall: The percentage of customers who actually churn that the model predicts will churn...

The main risk associated with deploying this model in production is that it may make incorrect predictions about whether or not a customer will churn. This could lead to the institution losing customers or incurring additional costs to retain customers. To mitigate this risk, the institution will monitor the model's performance in production and retrain the model on new data as needed. The institution will also use the model's predictions in conjunction with other factors, such as customer relationship management data, to make decisions about customer retention....

FIG. 2D

SYSTEMS AND METHODS FOR SEARCHING AND STORING DATA OVER A COMPUTER NETWORK

CROSS-REFERENCE TO RELATED APPLICATION(S)

This application is a continuation-in-part of U.S. patent application Ser. No. 18/544,303, filed Dec. 18, 2023, now U.S. Pat. No. 12,340,194, issued Jun. 24, 2025. The content of the foregoing application is incorporated herein in its entirety by reference.

BACKGROUND

Computer networks and the process of searching for applications within them are becoming increasingly complicated due to the rapid growth in both the number and diversity of connected devices, applications, and services. As organizations and individuals rely more heavily on cloud computing, virtualization, and mobile technologies, networks have expanded far beyond traditional physical boundaries, introducing complex architectures like hybrid and multi-cloud environments. This complexity makes it harder to maintain a centralized overview of all network assets. Additionally, the rise of dynamic IP addressing, encrypted communications, and decentralized data storage makes it more challenging to track, identify, and manage applications across the network. Security concerns also play a significant role-administrators must ensure that search and access mechanisms do not expose the network to vulnerabilities, which often requires sophisticated tools and protocols. All of these factors contribute to a more intricate and layered environment, making the task of locating and managing applications within a network significantly more demanding than in the past.

These technical problems become even more challenging when users need to search for specific portions of code within applications stored across a computer network because code is often distributed across multiple servers, repositories, and environments. Unlike files with clear labels or metadata, code may be embedded within complex folder structures, different programming languages, or even containerized systems that are not easily searchable through standard tools. Version control systems add another layer of complexity, as code can exist in multiple branches, versions, or forks, making it difficult to determine which version is relevant. Moreover, network latency, permission restrictions, and varying access protocols can hinder the ability to perform efficient, comprehensive searches. In large organizations, different teams may use different platforms or coding standards, leading to inconsistencies that further complicate the search process. All of these factors make it significantly harder to locate and retrieve precise code segments, especially when working within the constraints of a sprawling, modem networked environment.

SUMMARY

In view of the technical problems discussed above, systems and methods are described herein for searching and storing data across a computer network. As mentioned above, key technical challenges to overcome are the intricate and layered environment of modern computer networks and the lack of centralized platforms, coding standards, and/or terminologies for performing the search. To overcome these key technical challenges, the systems and methods allow a sample of code to be used as a search input to find similar code samples, helping overcome many of the technical challenges associated with searching and storing data across complex computer networks. By using code-based search, users can bypass inconsistencies in naming conventions, documentation, or metadata that often hinder traditional keyword-based searches, especially in environments lacking centralized platforms or uniform coding standards. This approach leverages the structure and syntax of the code itself, enabling search tools to identify patterns, functions, or logic that are similar, even if they are written using different variable names or formatting styles. In intricate network environments, where applications and code are distributed across multiple systems and repositories, such intelligent code searching reduces the reliance on human knowledge of exact file locations or terminology. It also improves efficiency by narrowing down results to contextually relevant matches, regardless of where or how the code is stored. This makes it significantly easier for developers and administrators to locate, understand, and reuse code across a decentralized and technically diverse network landscape.

Unfortunately, the use of code samples as a means to bypass conventional keyword-based searching introduces a novel technical problem: it removes the user's clear understanding and control over how search results are generated. In conventional searches, users provide explicit search terms and can reasonably predict why a result appears—it contains the keyword or phrase they entered. This transparency creates trust and allows users to refine their searches with precision. However, when a code sample is used as input, the search process becomes much more opaque and complex. The system must analyze the structure, logic, syntax, and semantics of the code, then compare it against other code samples using a range of criteria such as functional similarity, structural patterns, or even inferred intent. These comparisons rely on sophisticated algorithms, heuristics, and machine learning models that operate beyond the user's visibility or control. As a result, users may not understand why certain results are returned, especially if the returned code differs significantly in appearance but is deemed "functionally similar." This can lead to confusion, reduced confidence in the system, and difficulty refining searches, highlighting a trade-off between advanced functionality and user interpretability.

To overcome this novel technical problem, the systems and methods compare code sample characteristics—described through inputted feature inputs—to labeled code sample characteristics from a plurality of labeled code samples to transform a complex, opaque code search process into a structured and interpretable framework. This method enables the system to analyze the input code sample based on a defined set of technical features—such as control flow patterns, API usage, data structures, or functional behavior—rather than relying solely on raw text similarity or implicit algorithmic inference. By aligning these inputted features with pre-labeled characteristics of known code samples, the system can produce precise and explainable outputs that identify relevant code matches from the labeled dataset. To compensate for any lack in interpretability, the systems and methods subsequently generate human-readable descriptions of the labeled code sample corresponding to the outputs based on the pre-labeled characteristics of known code samples. By using the pre-labeled characteristics of known code samples as opposed to the outputs themselves, which may lack centralized platforms, coding standards, and/or terminologies, the users only need to be familiar with the pre-labeled characteristics of known code samples. This dual-layered approach—feature-based comparison followed by descriptive output—provides a robust solution to the lack of transparency that may arise in code-similarity searches and allows for navigation of large, decentralized, and heterogeneous code environments.

In some aspects, systems and methods are described herein for searching and storing data over a computer network. For example, the system may receive, via a user interface, a first user input comprising a first search request for code samples in a datastore having a first characteristic. The system may generate a first feature input based on the first search request. The system may input the first feature input into a first model to receive a first output, wherein the first output comprises a labeled code sample comprising a first labeled characteristic that corresponds to the first characteristic, and wherein the first model is trained to compare code sample characteristics described by inputted first features inputs to labeled code sample characteristics corresponding to one or more of a plurality of labeled code samples to generate outputs identifying one or more of the plurality of labeled code samples. The system may generate a second feature input based on the first output. The system may input the first output into a second model to receive a second output, wherein the second output comprises a human-readable description of the labeled code sample, and wherein the second model is trained to generate descriptions related to the labeled code sample characteristics of the one or more of the plurality of labeled code samples identified by feature based on inputted second feature inputs. The system may generate for display, in the user interface, a first recommendation based on the second output.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-1B show an illustrative user interface generating inputs to a model risk documentation platform, in accordance with one or more embodiments.

FIGS. 2A-2D show an illustrative user interface generating for a model risk documentation platform, in accordance with one or more embodiments.

DETAILED DESCRIPTION OF THE DRAWINGS

Figure 1B:
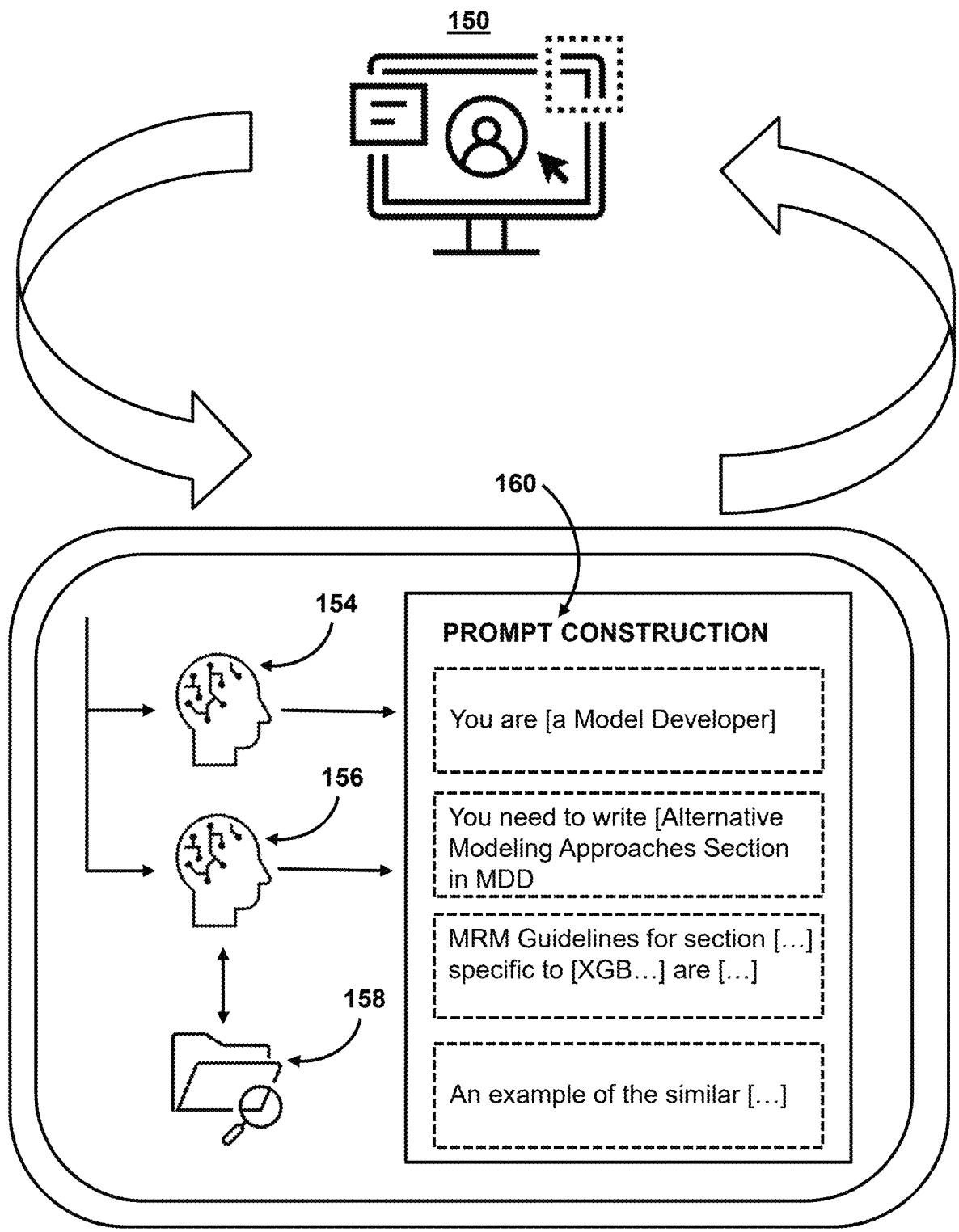

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Artificial intelligence, including, but not limited to, machine learning, deep learning, etc. (referred to collectively herein as "artificial intelligence models", "machine learning models," or simply "models") has excited the imaginations of both industry enthusiasts and the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

Artificial intelligence can be used in both comparing code sample characteristics and generating human-readable descriptions, leveraging advanced techniques in machine learning and natural language processing (NLP). To compare code sample characteristics, AI models—particularly those based on deep learning—can be trained to extract and represent code semantics and structure using feature embeddings. These embeddings capture complex aspects of the code, such as control flow, data dependencies, syntactic patterns, and functional behavior, in a numerical form that facilitates efficient comparison across code samples. Models like graph neural networks (GNNs) or transformer-based architectures (e.g., CodeBERT or GraphCodeBERT) are particularly effective at analyzing the syntax and semantics of source code and identifying similarities at a conceptual level. Once relevant matches are identified, AI can then use NLP techniques to generate human-readable descriptions. Large language models (LLMs) can be trained or fine-tuned to summarize code functionality by converting the structured representation of code into coherent natural language explanations. These descriptions help users understand the intent and utility of the code without needing to analyze the code manually. Through this dual application of AI-semantic comparison and natural language generation—the system offers a powerful and scalable solution for navigating and interpreting complex codebases across distributed and varied computing environments.

FIG. 1A shows an illustrative user interface for searching and storing data over a computer network, in accordance with one or more embodiments. For example, FIG. 1A may show a first model for searching and storing data that is used to compare labeled code samples to received requests. For example, the system may receive, via user interface 100, a first user input (e.g., input 102) comprising a first search request for code samples in a datastore having a first characteristic.

A user interface may be a point of interaction between a user and a computer system, application, or device, allowing the user to communicate their inputs and receive outputs in a meaningful and accessible way. It encompasses the visual elements, controls, and design features that enable users to navigate software or hardware systems—such as buttons, menus, icons, text boxes, and graphical displays. User interfaces can take various forms, including graphical user interfaces (GUIs) like those found in modern web or desktop applications, command-line interfaces (CLIs) used in terminal environments, and even voice or gesture-based interfaces in more advanced systems. The primary goal of a user interface is to make the underlying functionality of a system usable, efficient, and intuitive, translating complex processes into clear and manageable actions for the user. A well-designed user interface enhances usability, reduces errors, and improves the overall user experience by aligning system operations with user expectations.

The user interface may display a variety of information to help users interact effectively with the system. This can include search results or recommendations based on user queries, such as relevant code samples, documents, or data entries. To improve clarity and usability, the interface may also present human-readable descriptions that explain the content or functionality of the returned results. Input fields are commonly shown to allow users to enter search terms, upload files, or define specific criteria for their queries. Additionally, the interface may display metadata related to the results, such as labels, tags, creation dates, or authorship, which provide context and support decision-making. Visual feedback elements—like loading indicators, error messages, or confirmation prompts—inform the user about the system's status or response to their actions. Interactive controls such as buttons, menus, sliders, and filters enable users to refine results, adjust preferences, or perform additional actions. Navigation tools, including tabs, links, and breadcrumbs, help users move smoothly through different sections of the application. Overall, the information displayed in the user interface is designed to facilitate intuitive and efficient user interaction with the system.

In some embodiments, the search request for code samples in a datastore having a first characteristic may refer to a user-initiated query aimed at locating specific code snippets or examples within a large collection of stored code, where the desired code exhibits a particular feature or trait. This characteristic defines what the user is looking for in terms of functionality, structure, or behavior. For example, the characteristic might be a specific programming function such as "sorting a list using quicksort," a structural pattern like "recursive function calls," or an implementation detail such as "code that interacts with a REST API." Other examples include code written in a particular programming language (e.g., Python or Java), code that utilizes a specific library or framework (e.g., TensorFlow or React), or code that matches a performance profile (e.g., optimized for low memory usage). By specifying this characteristic in the search request, the user aims to retrieve code samples from the datastore that meet these criteria, making it easier to find relevant, useful code in large, complex repositories.

For example, the search request may recite "INSTRUCTION: Can you help me to write the Alternative Modeling Approaches Section?CONTEXT: I've built a XGBoost Model to score Residential Mortgage loan portfolios." This request would be a query submitted to a system designed to retrieve code or content related to alternative modeling techniques used in financial risk assessment. In this case, the user is seeking assistance in drafting a section of a technical report or documentation, specifically focused on modeling approaches other than XGBoost. The system interprets the instruction as a request for writing support and uses the context to understand that the current approach involves using an XGBoost model on residential mortgage loan portfolios. Based on this input, the system may search for code samples or technical content in its datastore that describe or demonstrate other machine learning models suitable for similar tasks-such as logistic regression, random forests, support vector machines, or neural networks. The goal of this search is to identify examples that match the characteristic of being alternative modeling approaches for credit scoring or mortgage risk prediction, thereby helping the user generate informative and relevant content for their report.

The system may generate a first feature input based on the first search request. For example, the system may generate a first feature input based on the first search request by analyzing both the instruction and the context provided by the user to extract meaningful characteristics that describe the intent and technical focus of the query. This process typically involves natural language processing (NLP) techniques to interpret the semantic content of the instruction—for example, recognizing that the user is requesting help with "Alternative Modeling Approaches"—as well as identifying key concepts in the context, such as the use of an "XGBoost Model" and the application domain of "Residential Mortgage loan portfolios." The system then maps these extracted elements to a predefined set of features that capture relevant technical attributes, such as the type of modeling technique, the financial application domain, and the desired output format (e.g., descriptive text or code samples). These features are encoded into a structured representation—often as a vector or embedding—that serves as the input to a trained model. This first feature input enables the system to perform a more targeted and intelligent search by comparing the encoded characteristics of the user's query against labeled examples in its datastore, ultimately improving the relevance and accuracy of the results returned.

In some embodiments, when the system receives an inputted code sample, the system may generate the first feature input by analyzing the code's structural, syntactic, and semantic characteristics. This process typically begins with parsing the code to extract meaningful components such as function definitions, control flow patterns, data types, imported libraries, and API calls. The system may use a combination of static code analysis and machine learning techniques to identify patterns that describe what the code does, how it is structured, and which external dependencies it uses. These characteristics are then translated into a structured feature representation—often using embeddings generated by deep learning models such as CodeBERT or graph neural networks—that capture both the surface-level syntax and deeper functional behavior of the code. This feature input allows the system to perform a more abstract, language-agnostic comparison between the input code and a large set of pre-labeled code samples, enabling it to identify matches that go beyond simple text similarity. By converting the input code sample into a standardized, machine-readable feature vector, the system can efficiently search for and retrieve relevant results based on functionality, design, or purpose.

The system may input the first feature input into a first model (e.g., model 108) to receive a first output, wherein the first output (e.g., output 104) comprises a labeled code sample (e.g., sample 106) comprising a first labeled characteristic that corresponds to the first characteristic, and wherein the first model is trained to compare code sample characteristics described by inputted first features inputs to labeled code sample characteristics corresponding to one or more of a plurality of labeled code samples to generate outputs identifying one or more of the plurality of labeled code samples.

For example, the system may input the first feature input into a first model—such as model 108—by passing the structured representation of the code sample or search query, derived through earlier feature extraction, into the trained model's input layer. This first model is designed to compare the inputted features with a set of labeled code sample characteristics that are part of a larger repository of pre-processed and categorized code. Each labeled code sample in the repository includes metadata or annotations describing specific characteristics—such as functionality, algorithm type, or domain relevance—which serve as the basis for comparison. The model, having been trained on a wide range of such examples, uses learned representations to assess the similarity between the input features and those of the stored labeled samples. It then generates a first output, such as output 104, that identifies one or more labeled code samples, like sample 106, which exhibit a labeled characteristic that corresponds to the first characteristic described in the original input. This output represents the system's best-matching results based on a feature-level comparison, allowing it to retrieve semantically and functionally relevant code samples even when there is variation in syntax or implementation style. This process enables accurate and intelligent code retrieval that goes beyond traditional keyword searches by leveraging deep model-based understanding of code behavior and structure.

An example of an output, such as output 104, may recite "Generated output for your specific model type and other info, which is aligned with previous MDD responses and guidance." This output could be a system-generated summary or recommendation tailored to a user's prior queries and the characteristics of a specific machine learning model—in this case, perhaps an XGBoost model used for scoring residential mortgage loans. For instance, the output might include a paragraph recommending the consideration of alternative modeling approaches such as logistic regression, random forests, or neural networks, along with brief descriptions of their applicability in mortgage risk prediction. The phrase indicates that the response is not only generated based on the technical details of the current request but also aligns with previous model development documentation (MDD) responses and established best practices. This alignment ensures consistency across documentation and modeling workflows, while the tailored content helps the user maintain coherence with earlier project outputs or regulatory guidance. The result is an informed, context-aware suggestion that supports the user's ongoing work within the same modeling framework.

A code sample, such as sample 106, may include a snippet or full segment of source code that performs a specific function, demonstrates a programming concept, or implements a particular algorithm. It may contain function or class definitions, variable declarations, comments, and relevant import statements needed to execute the code within its intended environment. In some cases, the code sample may also be accompanied by metadata, such as the programming language used, the context or domain it applies to (e.g., finance, machine learning), and descriptive labels identifying its key characteristics. A user can access the code sample through the system's user interface, where it is typically presented as part of the search results or recommendations generated by the model. Once displayed, the user can view, copy, or download the code and, in some cases, even run it in an embedded environment or export it to a development platform. Users often integrate such code samples directly into their own projects, adapt them for specific use cases, or use them as references to guide their own implementations. The system's ability to surface relevant and well-structured code samples streamlines development workflows and helps users quickly find practical solutions to coding challenges.

The system may generate for display, in user interface 100, a first recommendation based on the second output. For example, the system may generate for display, in user interface 100, a first recommendation based on output 104 and sample 106 by first interpreting the relevance of the retrieved code sample in the context of the user's original query. After output 104 identifies sample 106 as a code sample with characteristics matching the user's request, the system analyzes both the labeled metadata and the content of the sample to construct a recommendation that is both actionable and easy to understand. This recommendation may include a brief summary of what the code does, how it aligns with the specified characteristic (e.g., an alternative modeling approach to XGBoost), and why it is relevant to the user's use case. The system may enhance this recommendation with additional contextual details, such as the modeling domain (e.g., mortgage risk), key functions used in the code, or related best practices. This information is then formatted and displayed in user interface 100, alongside or linked to the actual code sample, so the user can easily review the suggestion, understand its purpose, and integrate or adapt the code as needed. By presenting the recommendation in a clear and structured way, the system helps bridge the gap between complex code retrieval and practical user application.

In some embodiments, the recommendation may aid in streamlining software development that includes artificial intelligence components by providing targeted, context-aware guidance that supports compliance with model risk management (MRM) policies, standards, and guidelines. For instance, in the context of model validation, the recommendation can present alternative modeling approaches or code implementations that align with regulatory expectations for benchmarking, model robustness, and transparency. By surfacing code samples that adhere to best practices—such as well-documented algorithms, explainable modeling techniques, or proper data handling procedures—the system helps ensure that the development process remains auditable and consistent with governance requirements. These recommendations can also support code validation efforts by offering verified examples or patterns that promote standardization, reduce the risk of undocumented code behavior, and highlight potential gaps in current implementations. Furthermore, because the recommendations are generated based on both the specific characteristics of the user's AI model and previously validated samples, they serve as valuable reference points for reviewers and validators conducting independent assessments. Overall, integrating these recommendations into the development workflow fosters greater alignment with MRM frameworks, accelerates validation reviews, and promotes the creation of transparent, well-governed AI systems.

FIG. 1B shows an illustrative user interface for searching and storing data over a computer network, in accordance with one or more embodiments. For example, FIG. 1B may show a second model for searching and storing data that is used to compare labeled code samples to received requests.

For example, the system may generate a second feature input based on the first output (e.g., as described in FIG. 1A). The system may input the first output into a second model to receive a second output, wherein the second output comprises a human-readable description of the labeled code sample, and wherein the second model is trained to generate descriptions related to the labeled code sample characteristics of the one or more of the plurality of labeled code samples identified by feature based on inputted second feature inputs. The system may generate for display, in the user interface (e.g., user interface 150, which may correspond to user interface 100 (FIG. 1A)), a first recommendation based on the second output.

For example, the system may receive an input of the first output—comprising one or more labeled code samples identified by the first model—and process it through a second model to generate a second output, which consists of a human-readable description of the labeled code sample. This second model may be specifically trained to generate natural language descriptions that relate to the characteristics of the labeled code samples, such as their structure, purpose, or functional behavior. To generate this second output, the system may use a combination of components: a first model component 154 and a second model component 156. Together, these components are used to construct a prompt—such as prompt 160—which serves as the input to the second model. This prompt may be generated using a pre-defined template that guides the model in producing clear and relevant descriptions.

In addition, the system can access metadata 158 associated with the labeled code samples, which may include tags, classifications, or usage context, to enrich the prompt and ensure the generated description is both accurate and context-aware. The system may also perform additional searches to gather supporting information, further enhancing the quality of the generated output. Once the second model generates the human-readable description, the system compiles the result into a user-friendly format and displays it in the user interface—such as user interface 150, which corresponds to the earlier-referenced user interface 100. The final display includes a first recommendation based on the second output, providing the user with a meaningful explanation of the code sample's purpose or functionality. This layered approach increases transparency, improves usability, and helps the user more effectively interpret and apply the recommended code within their specific development or model governance context.

In some embodiments, the system uses first model component 154 and second model component 156 due to their ability to work collaboratively to generate more accurate, context-aware, and user-aligned prompts for producing human-readable descriptions of labeled code samples. The first model component can be designed to handle the extraction and structuring of relevant information from the labeled code sample—such as its functional characteristics, metadata, and code context—while the second model component specializes in transforming this structured input into natural language using a trained language generation model. This modular design allows each component to focus on a specific subtask, thereby improving the efficiency, accuracy, and maintainability of the overall system. By splitting responsibilities between components, the system can also incorporate flexibility in updating or fine-tuning either component independently to adapt to new code structures, templates, or use cases. Moreover, this approach facilitates the dynamic generation of prompts (e.g., prompt 160) based on templates, metadata, and prior outputs, which enhances the quality and relevance of the final descriptions. Overall, the dual-component architecture enables more precise control over the input-to-output transformation process, ultimately resulting in more reliable and interpretable recommendations for users.

Using first model component 154 and second model component 156 may provide a structured and flexible approach to template creation and use, which enhances the quality and consistency of outputs such as human-readable descriptions. The first model component 154 is responsible for identifying and extracting key features, metadata, and contextual information from the labeled code sample or output data. This component essentially gathers and organizes the necessary content elements that are relevant to the code's purpose, structure, or behavior. Once this information is collected, the second model component 156 takes over to map the structured content into a coherent natural language format using a predefined template. These templates act as guides that define the format, tone, and structure of the output, ensuring clarity and consistency across different recommendations. By separating the feature extraction (handled by the first component) from the language generation (handled by the second), the system can more easily adapt templates to different domains, model types, or regulatory contexts. Additionally, this modular design allows for dynamic template selection or customization based on the type of code or metadata involved. This results in more targeted, readable, and policy-aligned descriptions, streamlining communication and documentation within software development and model governance workflows.

Using first model component 154 and second model component 156 in conjunction with a template helps maintain standardization by enforcing a consistent structure and language across outputs, regardless of the diversity or complexity of the underlying code samples. This architecture leverages the pre-labeled characteristics of known code samples—such as functionality, algorithm type, or application domain—rather than relying on raw outputs, which may vary widely due to differences in coding practices, platforms, or terminologies. The first model component focuses on identifying and aligning these standardized characteristics, while the second model component transforms them into coherent, human-readable descriptions using a consistent template. This separation between data extraction and language generation ensures that the final outputs conform to predefined communication standards, making them easier to interpret, compare, and validate. As a result, users do not need to understand the intricacies of each code implementation or navigate inconsistent formats; they only need to be familiar with the standardized set of labeled characteristics. This dual-layered approach—feature-based comparison followed by templated descriptive output—provides a robust and scalable solution for addressing the lack of transparency that often arises in code similarity searches. It also enables effective navigation of large, decentralized, and heterogeneous code environments, promoting consistency, traceability, and compliance across software development and model governance workflows.

In some embodiments, prompt construction may be used in requesting specific pre-labeled characteristics of known code samples by guiding the model to focus on defined attributes that are relevant to the user's intent or query. By incorporating structured input elements—such as keywords, metadata, or context—into the prompt, the system can explicitly reference the pre-labeled characteristics associated with code samples, such as algorithm type, functional purpose, data structures used, or application domain. The prompt acts as a targeted instruction set for the model, ensuring that the output reflects these specific characteristics rather than generating general or unrelated content. When built using a template, the prompt can consistently highlight which features to focus on, helping the model align its response with standard labeling schemas. For example, a prompt might include placeholders for characteristics like "model type," "data processing method," or "regulatory context," which are then filled using information extracted by the first model component. This structured approach not only increases the precision of the model's response but also supports the reuse of familiar and validated labels, reducing ambiguity for users and maintaining alignment with standardized coding and documentation practices.

FIGS. 2A-2B show an illustrative user interface generating inputs to a model risk documentation platform, in accordance with one or more embodiments. For example, despite these benefits and despite the wide-ranging number of potential uses, practical implementations of artificial intelligence have been hindered by several technical problems related to model risk. Model risk refers to the potential for errors, biases, inaccuracies, or unexpected behaviors within the models themselves. It encompasses the risks associated with the development, deployment, and utilization of models. For example, models might provide inaccurate predictions or classifications, leading to incorrect decisions. The uncertainty inherent in model algorithms, especially in complex or novel situations, can contribute to this risk. To further compound this issue, some models, like deep neural networks, are complex and lack transparency, making it difficult to understand how they arrive at specific conclusions. This opacity can pose risks, particularly in critical applications where interpretability is crucial. As another example, model performance heavily relies on the quality and relevance of the training data. Inaccurate, incomplete, or biased data can lead to poor model performance or unexpected behaviors. Even with accurate data, over time, the relationship between input data and the real-world phenomenon being modeled may change. This can lead to a decline in model performance if the model is not regularly updated or retrained with new data. Finally, models can be vulnerable to adversarial attacks, where malicious inputs are specifically designed to deceive the model, leading to incorrect outputs or compromising the system's security. Blindly trusting models without understanding their limitations or using them in inappropriate contexts can lead to overreliance and incorrect decisions, posing risks to businesses and stakeholders. These technical problems present an inherent issue when attempting to use artificial intelligence-based solutions.

In view of the aforementioned technical problems, systems and methods are described herein for streamlining software development that contains artificial intelligence components to be aligned with model risk management policies, standards, and/or guidelines. Model risk management for artificial intelligence models may refer to the process of identifying, assessing, mitigating, and/or monitoring the risks associated with the development, deployment, and/or usage of artificial intelligence models as well as documenting those risks in model development documentation. For example, a software development team may be required to identify and document potential risks associated with models, such as biases, data quality issues, interpretability challenges, security vulnerabilities, model drift, and/or unexpected outcomes, as well as assess the likelihood and impact of identified risks and/or how these risks might affect the model's performance, compliance, reputation, and/or the organization's overall objectives. To identify and document potential risks and/or impacts thereof, the software development team may use a model risk documentation platform to generate comprehensive records of model development, validation, and performance, which are crucial for reporting on model performance, risks, and actions taken to mitigate those risks.

To achieve these features, the model risk documentation platform utilizes an artificial intelligence solution that serves as an intelligent assistant in the validation of artificial and/or model processes, contributing to increased efficiency and accuracy through its ability to use Large Language Model (LLM) components to learn from unstructured data and transfer knowledge from other areas as well as generate text, code, and/or documentation snippets that address model risk management.

Unfortunately, utilizing an artificial intelligence solution for a model risk documentation platform invokes many of the technical challenges inherent to artificial intelligence itself. For example, a model risk documentation platform for artificial intelligence models typically involves training an artificial intelligence model to detect patterns (or anomalies) in the performance or other characteristics of existing models that may indicate a potential risk (or lack thereof). To maintain the accuracy, the model risk documentation platform must receive training data with high quality and representativeness of model performances and/or characteristics (e.g., labeled training data) that can impact performance (e.g., used to categorize a given model). However, training data with high quality and representativeness for training a model for model risk documentation platform is sparse and difficult to generate.

For example, generating training data for the model risk documentation platform comprises the system extracting rules or requirements from risk management guidelines, summarizing application/software code, determining business requirements, parsing public domain knowledge bases, and/or otherwise identifying industry best practices and knowledge. The system then formats these extracted rules to generate labeled documentation and/or improvements to application processes, code functions, and/or software workflow approaches. The labeled documentation and/or improvements must then be compared to code samples that conform to (or violate) the extracted rules in order to validate specific code samples. Once the model is trained, code samples may be inputted into the model to be validated.

However, validating code samples based on formatted rules raises yet another technical issue. In most instances, the labeled documentation and/or improvements to rules are extracted, formatted, and/or summarized from copious amounts of different sources, in which each source includes its own terminology and/or taxonomy. Additionally, each individual labeled documentation and/or improvement may correspond to multiple rules. Thus, inputting a code sample for validation, querying the model for documentation for a particular rule, and/or requesting generation of a code sample may result in the system outputting copious amounts of non-essential code, rules, and/or documentation (e.g., code, rules, and/or documentation relating to potential issues not needed to be addressed). One approach to such a problem would be to limit the input to the model (e.g., allow inputs of only a portion of a code sample, train the model on only a portion of the sources, require length limits on documentation produced). Such an approach however would unnaturally restrict the outputs (e.g., degrading their quality and/or completeness), limit the ability of the model to detect context (e.g., based on different terminology and/or taxonomy), and/or impact accuracy of the predictions by further limiting the already sparse training data.

The systems and methods overcome this issue through the use of a native kernel for generating code, rules, and/or documentation in the model risk documentation platform. For example, the native kernel streamlines the code, rule, and/or documentation process by automating the generation of relevant and accurate content. The native kernel does this by comprising an objective or guideline relevant to the desired output that is native (e.g., described in the terminology and/or taxonomy) of the source content (e.g., the native code, rule, and/or documentation). The native kernel is processed independently through the model risk documentation platform such that the native kernel is not used to generate outputted code, rule, and/or documentation, which could risk introducing bias, but is instead used to filter the output to outputted code, rule, and/or documentation specific to the objective or guideline.

Moreover, as the native kernel is described in the native terminology and/or taxonomy, the native kernel is intuitively selectable by a user that may be referencing the source content. As such, the model risk documentation platform may provide concise and context-aware responses to queries for model risk management-specific questions, such as explaining the impact of model drift on performance. Given the conversational manner of the inputs and outputs, the system may assist in generating reports, summaries, and/or briefs on model validation requirements while improving the efficiency of communication within the validation process. Similarly, the model risk documentation platform may create concise documentation snippets based on code, describing functions or summarizing models.

In some aspects, systems and methods for streamlining risk modeling in software development using natively sourced kernels are described. For example, the system may receive, via a user interface, a first user input comprising a validation request for a first model, wherein the first model corresponds to a first software development project. The system may receive, via the user interface, a second user input comprising a native kernel for the first model, wherein the native kernel comprises a native code sample and a native description of the native code sample. The system may input the native code sample into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, and wherein the labeled code samples comprise a first subset of labeled code samples successfully validated against the rulesets and a second subset of labeled code samples unsuccessfully validated against the rulesets. The system may filter the first output based on the native description to generate a first validation assessment for the first model. The system may generate for display, in the user interface, the first validation assessment.

FIG. 2A shows an illustrative user interface generating inputs to a model risk documentation platform, in accordance with one or more embodiments. As described herein, a model risk documentation platform may comprise a system or framework designed to oversee and manage the risks associated with models (e.g., financial models) used within an organization. For example, these platforms may be used for ensuring the accuracy, reliability, and/or compliance of models used in various financial and business operations. The model risk documentation platform may help in identifying, assessing, mitigating, and/or monitoring risks arising from model usage.

In some embodiments, the model risk documentation platform may catalog a plurality of models used within an organization, including their purposes, data sources, methodologies, and dependencies. The model risk documentation platform may evaluate the risks associated with each model, categorizing them based on complexity, materiality, regulatory impact, and/or potential issues. The model risk documentation platform may conduct rigorous testing and validation processes to ensure the accuracy, reliability, and/or appropriateness of the models used. This may involve comparing model outputs against real-world data and validating the assumptions and methodologies used. The model risk documentation platform may maintain comprehensive documentation of models and their development processes, assumptions, limitations, and validation results. For example, the system may be used to automate the preparation of Model risk management validation documentation, which can be a time-consuming and error-prone process. The model risk documentation platform may implement governance policies and procedures to ensure compliance with regulatory standards and internal guidelines. The model risk documentation platform may continuously monitor model performance and changes in assumptions or data inputs and/or provide regular reports to stakeholders, highlighting any emerging risks or issues. The model risk documentation platform may manage different versions of models and track changes made to ensure transparency and accountability. The model risk documentation platform may integrate with other systems and facilitate collaboration among different departments involved in model development, validation, and usage. For example, the system model risk documentation platform may ensure adherence to regulatory requirements, industry standards, and best practices related to model risk management.

Model risk management for artificial intelligence models may refer to the process of identifying, assessing, mitigating, and/or monitoring the risks associated with the development, deployment, and/or usage of artificial intelligence models. For example, the model risk management may detect and document the potential risks associated with models, such as biases, data quality issues, interpretability challenges, security vulnerabilities, model drift, and/or unexpected outcomes. Model risk management may also assess the likelihood and impact of identified risks and/or how these risks might affect the model's performance, compliance, reputation, and/or the organization's overall objectives. Model risk management may also include generating comprehensive records of model development, validation, and performance, which is crucial as reporting on model performance, risks, and actions taken to mitigate those risks is essential for internal stakeholders, regulators, and/or auditors.

As referred to herein, a "user interface" may comprise a human-computer interaction and communication in a device and may include display screens, keyboards, a mouse, and the appearance of a desktop. For example, a user interface may comprise a way a user interacts with an application or a website. A user interface for a model risk documentation platform may comprise any content.

As referred to herein, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices but can also be part of a live performance. Furthermore, user-generated content may include content created and/or consumed by a user. For example, user-generated content may include content created by another but consumed and/or published by the user.

In some embodiments, the content may comprise inputs and outputs that are generated for display on a user interface. As described below, the system may receive inputs in a native format to a given model and receive outputs in a platform format. The model risk documentation platform may be designed to automate manual processes that have unstructured or frequently changing requirements. In some embodiments, the system may use an LLM and/or related components to learn from unstructured data and transfer knowledge from other areas, such as academic research. By doing so, the system may be more flexible and capable than rule-based solutions. The system may use these inputs to generate one or more outputs.

The model risk documentation platform may generate concise text answers for model risk management-specific questions, provide context-aware text generation, and assist with generating reports, summaries, and briefs on model validation requirements. The model risk documentation platform may also generate code snippets for model risk management tasks such as data cleaning, data preprocessing, and/or checking for outliers. The model risk documentation platform may generate concise documentation snippets based on code, such as describing a Python function or summarizing a machine learning model.

For example, the system may generate documentation in a required format for model risk management validation or other risk management review and for software, code, and/or applications. The system may perform this by extracting rules or requirements from risk management guidelines and extracting summaries from application/software code, business requirements, public domain knowledge bases, and/or other user/app documentation, as well as industry best practices and knowledge. The system may then use this knowledge to write documentation or suggest improvements to the application/approach.

In some embodiments, the system may intelligently extract rules and requirements from dynamic risk management guidelines, ensuring that the documentation remains up to date with the latest standards. To do so, the system may pull information from diverse sources, including application/software code, business requirements, domain knowledge, user and application documents, and industry best practices, as well as utilize advanced natural language processing to summarize complex information and distill key points for documentation. Unlike rule-based solutions, the system is not tied to specific templates or questions. The system may adapt to changes in model risk management requirements by dynamically incorporating updates, ensuring flexibility in addressing evolving industry standards. The system may leverage LLM components to process and learn from unstructured data, enhancing its capability to handle vast amounts of information effectively. The system may apply knowledge from various domains, including academic research, to enhance the quality and comprehensiveness of generated documentation.

In some embodiments, the system may then generate one or more outputs. For example, the system may provide concise and context-aware text answers for model risk management-specific questions, such as explaining the impact of model drift on performance. The system may assist in generating reports, summaries, and briefs on model validation requirements, improving the efficiency of communication within the validation process. The system may generate code snippets for model risk management tasks, such as data cleaning, preprocessing, and outlier detection. The system may enhance the reproducibility of validation tasks by automating the creation of code segments. The system may create concise documentation snippets based on code, describing functions or summarizing machine learning models.

For example, the model risk documentation platform (or system) may be used to generate a concise text answer to a model risk management-specific question such as "Explain the impact of model drift on performance?" The system may be used to provide context-aware text generation based on the following input: "Model drift can occur when the underlying data distribution changes over time. This can lead to a decrease in model performance, as the model is no longer able to accurately predict the target variable." The system may be used to assist with generating a report on model validation requirements for a new machine learning model. The system may be used to generate a code snippet for cleaning data for a model validation task. The system may be used to generate a documentation snippet for a Python function that implements a machine learning model. The system may be used to generate a test plan for a new software application. The system may be used to create a user manual for a complex machine learning model. The system may be used to generate a risk assessment report for a new software development project. The system may be used to create a compliance checklist for a software application that is subject to regulatory requirements. The system may be used to generate a technical document that explains the design and implementation of a software system. The system may be used to create a training document for new employees who will be using a software application. The system may be used to generate a marketing brochure for a new software product.

Additionally or alternatively, the system may identify and correct grammatical errors and typos in documentation. The system may improve the clarity and conciseness of documentation. The system may add additional information to documentation, such as examples, illustrations, and definitions. The system may ensure that documentation is consistent with the latest software version. The system may make documentation more accessible to a wider audience by translating it into multiple languages.

FIG. 2A shows user interface 210. For example, the system may receive, via user interface 210, a first user input comprising a validation request for a first model, wherein the first model corresponds to a first software development project. A validation request may comprise a request to perform various tests and analyses to assess the model's performance. For example, this may involve comparing the model outputs with actual data, stress testing, sensitivity analysis, and/or scenario analysis to evaluate its accuracy, robustness, and potential weaknesses. Software development may be the process of creating, designing, programming, testing, and/or maintaining computer programs, applications, or systems. It may involve a structured approach to building software that fulfills specific requirements, solves problems, or provides functionalities for various purposes. User interface 210 may also receive a second user input.

The system may receive, via user interface 210, a second user input comprising a native kernel for the first model, wherein the native kernel comprises a native code sample and a native description of the native code sample. For example, as described herein, a native kernel for a model may refer to content that describes a core or foundational component of the model that the model risk documentation platform may use to generate outputs related to a particular model's life cycle, evaluation, validation, monitoring, and/or risk assessment. A native kernel may include one or more characteristics that are used by the model risk documentation platform to generate outputs. For example, the characteristics may comprise a model life cycle management characteristic (e.g., a characteristic that relates to the life cycle of a model, including model development, testing, deployment, and decommissioning), a versioning and tracking characteristic (e.g., a characteristic that relates to tracking different versions of the model and changes made over time and maintains a historical record of alterations, updates, or modifications), a documentation and metadata characteristic (e.g., a characteristic that relates to documentation and metadata related to the model, such as its purpose, inputs, outputs, assumptions, limitations, and associated risks), a validation and testing characteristic (e.g., a characteristic that relates to validation techniques, such as backtesting, stress testing, sensitivity analysis, and other validation procedures to ensure the model's accuracy and reliability), a risk assessment and governance characteristic (e.g., a characteristic that relates to tools and functionalities to assess and monitor risks associated with the model, including identifying biases, errors, or uncertainties), an integration with regulatory compliance characteristic (e.g., a characteristic that relates to integrating compliance requirements, ensuring that the model adheres to regulatory standards and guidelines), a collaboration and workflow management characteristic (e.g., a characteristic that relates to enabling collaboration among different stakeholders involved in managing the model, allowing for efficient workflow management and communication), a monitoring and performance analysis characteristic (e.g., a characteristic that relates to monitoring the model's performance in real time or at regular intervals, allowing for timely identification of issues or deviations from expected behavior), a security and access control characteristic (e.g., a characteristic that relates to implementing robust security measures to protect sensitive model information and data and controls access to authorized users), and/or a scalability and flexibility characteristic (e.g., a characteristic that relates to accommodating various types of models and their specific requirements, allowing scalability and flexibility in managing diverse models within the platform).

In some embodiments, the native kernel may comprise a native code sample and/or a native description of the native code sample. For example, as shown in user interface 210, the system may receive a native description of the native code sample. As described herein, a native description of a model may refer to a comprehensive and detailed representation or documentation of the model's characteristics, functionalities, assumptions, inputs, outputs, limitations, and underlying methodologies, among other crucial information. This description may be created externally to the platform itself and may be specific to the model being analyzed or managed. For example, the native description may comprise terminology and/or taxonomies that are specific to the model and not used by/specific to the model risk documentation platform.

The native description may comprise native description characteristics such as content related to model specifications (e.g., detailed information about the model's purpose, objectives, and the problem it aims to solve), model architecture (e.g., description of the model's structure, including algorithms, equations, or techniques used), input data (e.g., explanation of the data sources, variables, and assumptions used as inputs for the model), model validation and testing (e.g., documentation of how the model was validated, including backtesting, stress testing, sensitivity analysis, and other validation procedures), assumptions and limitations (e.g., articulations of the assumptions made by the model and its limitations in different scenarios or conditions), model outputs (e.g., explanation of how the model generates outputs and the interpretation of those outputs), model maintenance and versioning (e.g., information on any updates, modifications, or versioning applied to the model over time), risk assessment (e.g., evaluation of potential risks associated with the model, such as biases, errors, or uncertainties), compliance and regulatory information (e.g., any relevant compliance or regulatory considerations applicable to the model), and/or documentation of changes (e.g., records of any changes made to the model or its parameters and the reasons behind those changes). For example, the system may parse the native description for native description characteristics based on applying an LLM to process and learn from unstructured data in the native description.

FIG. 2B shows user interface 220. For example, the system may receive, via user interface 220, the native kernel comprising a native code sample. As described herein, a native code sample is a segment or snippet of source code taken from a larger program or project, often provided to illustrate specific functionalities, demonstrate programming techniques, or serve as an example of how to use a particular programming language, library, and/or framework. For example, the native code sample may comprise characteristics that are specific to the model code and not used by/specific to the model risk documentation platform code.

For example, the code sample can range from a few lines to several blocks of code, depending on the complexity of the concept being demonstrated or the problem being addressed. The code sample may be self-contained and focused on showcasing particular aspects of programming or solving a specific task. For instance, a code sample might demonstrate how to read and write data from a file, implement a sorting algorithm, connect to a database, create a basic web application, or perform various data analysis tasks using a specific programming language or framework.

The native code sample may comprise characteristics that are detected by the system. For example, the native code sample characteristics of a code sample include several key aspects that define its nature and usefulness such as conciseness (e.g., code samples are typically succinct and focus on demonstrating a specific concept, function, or use case without unnecessary complexity), clarity and readability (e.g., they are written in a clear and understandable manner, using proper formatting, naming conventions, and comments to enhance readability), isolation (e.g., code samples are often self-contained, meaning they can be understood and run independently without relying on external dependencies or extensive setup), purposefulness (e.g., each code sample serves a specific purpose, whether it is illustrating a programming concept, demonstrating an application programming interface (API) usage, solving a particular problem, or showcasing a specific technique), correctness (e.g., code samples should demonstrate best practices and correctness in terms of syntax, logic, and adherence to programming principles), relevance (e.g., they are relevant to the context in which they are provided, addressing the needs or queries of the audience they are intended for, such as beginners, developers working on a specific technology, or those seeking solutions to particular problems), documentation and explanation (e.g., good code samples often include explanatory comments or documentation that clarifies the purpose of the code, highlights important details, and guides readers through understanding the implementation), versatility (e.g., while focused on a specific task or concept, code samples might also showcase versatility by providing adaptable solutions that can be modified or extended for different scenarios), testability (e.g., code samples may include elements or instructions for testing the provided functionality or demonstrating expected outcomes), and platform independence (e.g., code samples may be designed to be platform-independent or specify the required platform or environment for execution if platform-specific). The system may use these characteristics to make the native code samples useful, understandable, and/or practical for use in generating outputs.

FIGS. 2C-2D show an illustrative user interface generating outputs for model risk documentation platform, in accordance with one or more embodiments. For example, the system may generate an output comprising a validation assessment. As described herein, a validation assessment may comprise content for a model risk documentation platform that comprises an evaluation of whether a model and/or platform effectively manages, documents, and/or mitigates risks. The content for the validation assessment may relate to documentation requirements (e.g., assessing the platform's ability to capture and store comprehensive information related to the model, including model development, validation, testing, and implementation details), accuracy and completeness (e.g., validating that the platform accurately reflects the current status of a model, ensuring completeness in terms of data inputs, assumptions, methodologies, and results), risk identification and assessment (e.g., evaluating the platform's capability to identify and assess risks associated with each model), governance and compliance (e.g., ensuring the model aligns with regulatory requirements and internal governance policies), version control and change management (e.g., assessing the model's version control mechanisms to track changes made to models, ensuring transparency and accountability), security and access controls (e.g., evaluating the model's security measures to safeguard sensitive model-related information), model performance monitoring (e.g., determining whether the model deviates from expected behavior or performance metrics), reporting and visualization (e.g., evaluating the platform's ability to report capabilities of the model and/or generate comprehensive and accessible reports for stakeholders, including executives, regulators, and internal risk management teams), integration and scalability (e.g., assess the model's ability to integrate with other systems and databases within the organization), and/or user training and support (e.g., evaluating the availability and effectiveness of user training and support resources for model users to ensure proper utilization and understanding of its functionalities).

FIG. 2C includes user interface 230. User interface 230 comprises an output of platform description. As described herein, a platform description of a model may refer to a comprehensive and detailed representation or documentation of the model's characteristics, functionalities, assumptions, inputs, outputs, limitations, and underlying methodologies, among other crucial information as determined by the platform. This description may be created internally by the platform itself and may be specific to the model being analyzed or managed. For example, the platform description may comprise terminology and/or taxonomies that are specific to the platform (as opposed to a specific model).

Similar to the native description, the platform description may comprise model specifications (e.g., detailed information about the model's purpose, objectives, and the problem it aims to solve), model architecture (e.g., description of the model's structure, including algorithms, equations, or techniques used), input data (e.g., explanation of the data sources, variables, and assumptions used as inputs for the model), model validation and testing (e.g., documentation of how the model was validated, including backtesting, stress testing, sensitivity analysis, and other validation procedures), assumptions and limitations (e.g., articulations of the assumptions made by the model and its limitations in different scenarios or conditions), model outputs (e.g., explanation of how the model generates outputs and the interpretation of those outputs), model maintenance and versioning (e.g., information on any updates, modifications, or versioning applied to the model over time), risk assessment (e.g., evaluation of potential risks associated with the model, such as biases, errors, or uncertainties), compliance and regulatory information (e.g., any relevant compliance or regulatory considerations applicable to the model), and/or documentation of changes (e.g., records of any changes made to the model or its parameters and the reasons behind those changes).

FIG. 2D includes user interface 240. User interface 240 comprises a description of an output of a platform code sample. As described herein, a platform code sample is a segment or snippet of source code taken from a larger platform program or project, often provided to illustrate specific functionalities, demonstrate programming techniques, or serve as an example of how to use a particular programming language, library, and/or framework. For example, the platform code sample may comprise characteristics that are specific to, or optimized for, the platform code.

For example, similar to the native code sample, the platform code sample can range from a few lines to several blocks of code, depending on the complexity of the concept being demonstrated or the problem being addressed. The platform code sample may be self-contained and focused on showcasing particular aspects of programming or solving a specific task for the platform (e.g., corresponding to the specific task of the native code sample). For instance, a native code sample that may have demonstrated how to read and write data from a file may be inputted into the system to receive an output of a corresponding platform code sample.

Figure 3A:
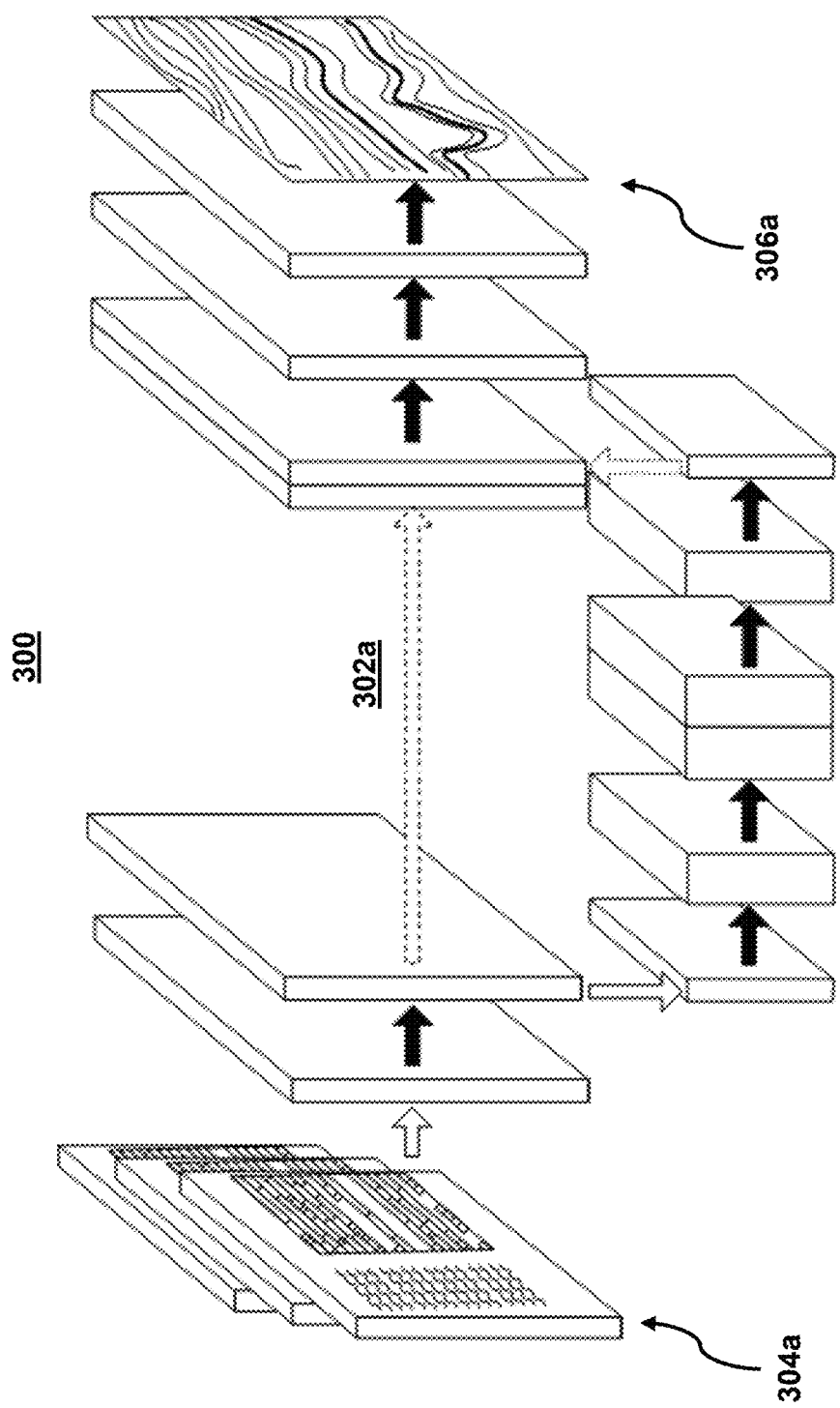
FIGS. 3A-3B show illustrative components for a system used to provide a model risk documentation platform, in accordance with one or more embodiments.
Figure 3B:
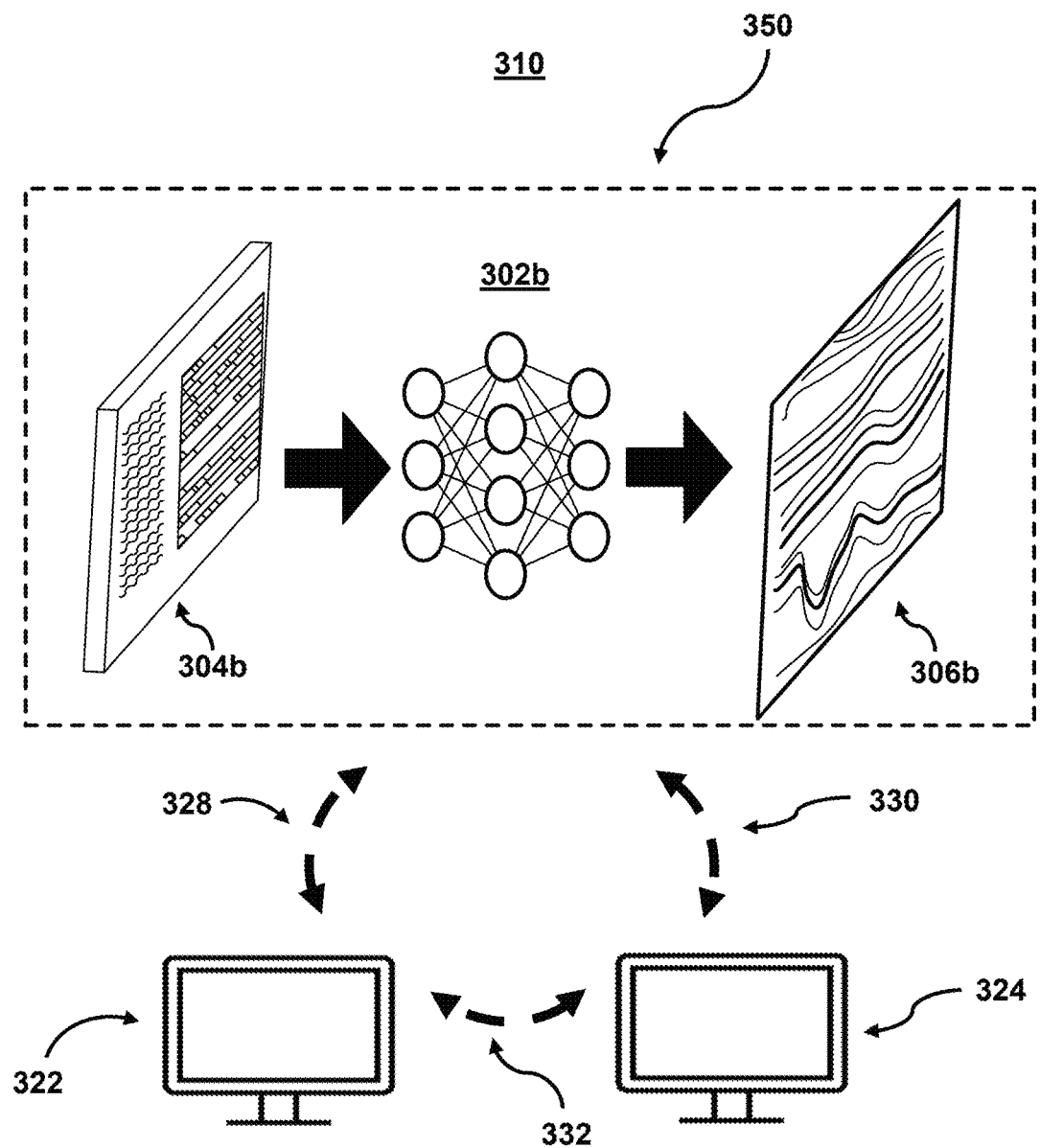

FIGS. 3A-3B show illustrative components for a system used to provide a model risk documentation platform, in accordance with one or more embodiments. For example, FIG. 3A may represent a model architecture used to streamline risk modeling in software development. System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302a (e.g., alone or in conjunction with user indications of the accuracy of outputs 306a, labels associated with the inputs, or other reference feedback information). For example, the system may receive a first labeled feature input, wherein the first labeled feature input is labeled with a known prediction for the first labeled feature input. The system may then train the first model to classify the first labeled feature input with the known prediction. For example, the system may catalog a plurality of models used within an organization, including their purposes, data sources, methodologies, and dependencies. The system may evaluate the risks associated with each model, categorizing them based on complexity, materiality, regulatory impact, and/or potential issues. The system may conduct rigorous testing and validation processes to ensure the accuracy, reliability, and/or appropriateness of the models used. This may involve comparing model outputs against real-world data and validating the assumptions and methodologies used. The system may maintain comprehensive documentation of models and their development processes, assumptions, limitations, and validation results. For example, the system may be used to automate the preparation of model risk management validation documentation, which can be a time-consuming and error-prone process. The system may implement governance policies and procedures to ensure compliance with regulatory standards and internal guidelines. The system may continuously monitor model performance and changes in assumptions or data inputs and/or provide regular reports to stakeholders, highlighting any emerging risks or issues. The system may manage different versions of models and track changes made to ensure transparency and accountability. The system may integrate with other systems and facilitate collaboration among different departments involved in model development, validation, and usage. For example, the system may ensure adherence to regulatory requirements, industry standards, and best practices related to model risk management.

Using this information, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

For example, the system may receive inputs of a native code sample into an artificial intelligence model (e.g., model 302a) and generate an output. The artificial intelligence model may be trained to validate code samples based on labeled source content and labeled code samples. For example, the labeled source content may comprise rulesets for security vulnerabilities that are extracted and reformatted from a plurality of sources. The labeled code samples may comprise a first subset of labeled code samples successfully validated against the rulesets and a second subset of labeled code samples unsuccessfully validated against the rulesets.

In some embodiments, the model (e.g., model 302a) may automatically perform actions based on outputs 306a. In some embodiments, the model (e.g., model 302a) may not perform any actions. The output of the model (e.g., model 302a) may be used to model risk documentation platforms. For example, the system may generate concise text answers for model risk management-specific questions, provide context-aware text generation, and assist with generating reports, summaries, and briefs on model validation requirements. The system may also generate code snippets for model risk management tasks such as data cleaning, data preprocessing, and/or checking for outliers. The system may generate concise documentation snippets based on code, such as describing a Python function or summarizing a machine learning model. For example, the system may generate documentation in a required format for model risk management validation or other risk management review and for software, code, and/or applications. The system may perform this by extracting rules or requirements from risk management guidelines and extracting summaries from application/software code, business requirements, public domain knowledge bases, and/or other user/app documentation, as well as industry best practices and knowledge. The system may then use this knowledge to write documentation or suggest improvements to the application/approach.

FIG. 3B shows illustrative components for a system used to provide a model risk documentation platform, in accordance with one or more embodiments. For example, FIG. 3B may show illustrative components for the system. As shown in FIG. 3B, system 310 may include user terminal 322 and user terminal 324. It should be noted that user terminal 322 and user terminal 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system and may feature one or more component devices. It should be noted that, while one or more operations are described herein as being performed by particular components of system 310, these operations may, in some embodiments, be performed by other components of system 310. As an example, while one or more operations are described herein as being performed by components of user terminal 322, these operations may, in some embodiments, be performed by cloud components. In some embodiments, the various computers and systems described herein may include one or more computing devices that are programmed to perform the described functions. Additionally or alternatively, multiple users may interact with system 310 and/or one or more components of system 310.

With respect to the components of user terminal 322 and user terminal 324, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both user terminal 322 and user terminal 324 include a display upon which to display data.

It should be noted that, in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user terminal 322 or user terminal 324. Alternatively or additionally, API layer 350 may reside on one or more of system 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 310 may be partially based on API layer 350 such that there is strong adoption of SOAP and RESTful web services, using resources like Service Repository and Developer Portal, but with low governance, standardization, and separation of concerns. Alternatively, system 310 may be fully based on API layer 350 such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., provide concise text answers for model risk management-specific questions, provide context-aware text generation, and assist with generating reports, summaries, and briefs on model validation requirements). In some embodiments, the system may use an LLM and/or related components to allow the system to learn from unstructured data and transfer knowledge from other areas, such as academic research. By doing so, the system may be more flexible and capable than rule-based solutions. The system may use these inputs to generate one or more outputs.

Model 302b is shown as a convolutional neural network. A convolutional neural network consists of an input layer (e.g., input 304b), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
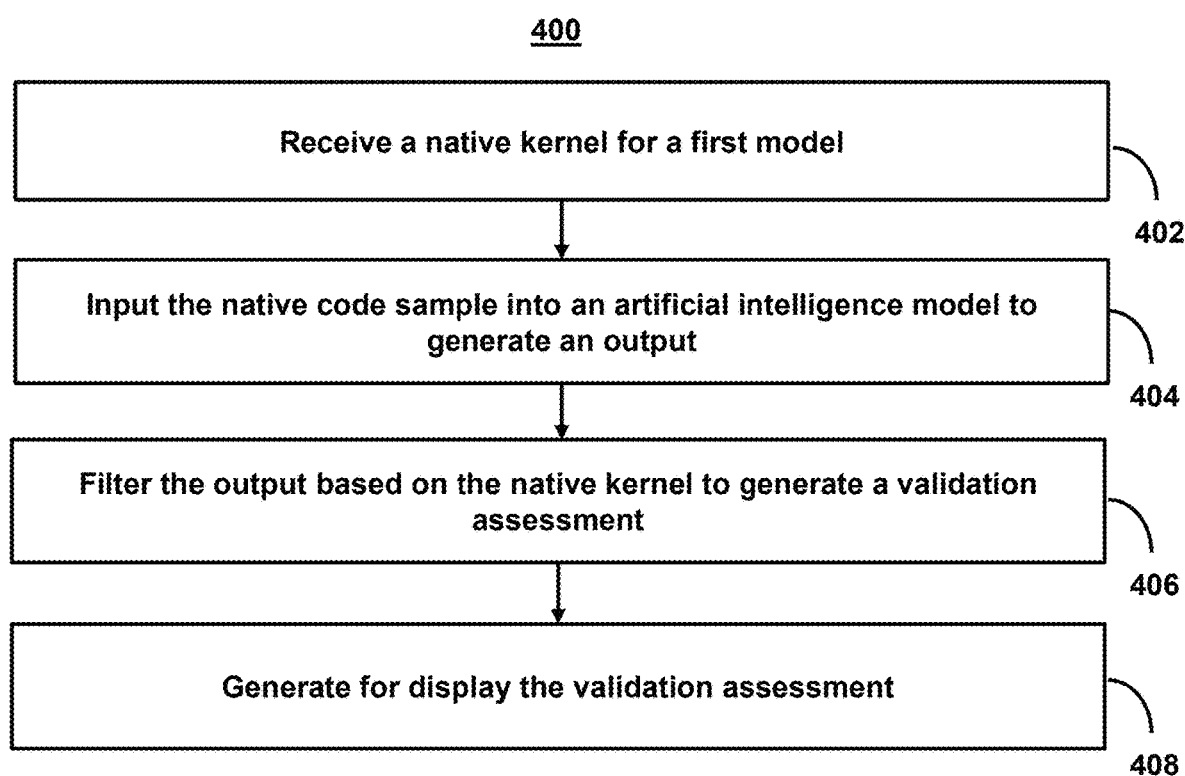
FIG. 4 shows a flowchart of the steps involved in streamlining risk modeling in software development, in accordance with one or more embodiments.

FIG. 4 shows a flowchart of the steps involved in streamlining risk modeling in software development, in accordance with one or more embodiments. For example, the system may use process 400 (e.g., as implemented on one or more system components described above) in order to streamline risk modeling in software development using natively sourced kernels.

At step 402, process 400 (e.g., using one or more components described above) receives a native kernel for a first model. For example, the system may receive, via a user interface, a first user input comprising a validation request for a first model, wherein the first model corresponds to a first software development project. The system's interface or application may receive the user input in various forms, such as a command-line instruction, a form submission on a graphical user interface (GUI), and/or an API request sent to the system. The system parses the user input to identify the specific validation request related to the first model of the software development project. This parsing process involves extracting relevant information, such as the model's name, project identifier, and/or any specific parameters associated with the validation request. The system may route the validated request to the appropriate module or component responsible for handling model validation tasks. This module may be part of the software development environment and is designed to manage validation procedures for different models within projects. Upon receiving the validation request, the system may retrieve necessary data related to the first model from the project repository or database. This data may include model specifications, documentation, testing protocols, and/or other relevant information needed for validation.

Additionally or alternatively, the system may receive, via the user interface, a second user input comprising a native kernel for the first model, wherein the native kernel comprises a native code sample and a native description of the native code sample. For example, the user may input the native code sample and the corresponding native description into the designated fields or sections within the user interface provided for model development or code input. The system may perform initial validation checks on the input data, ensuring it meets certain formatting requirements or constraints. It may also parse the user input to distinguish between the native code sample and its associated description. Once the user submits the input, the system processes this data and transmits it to the designated processing module responsible for handling model development, compilation, or interpretation.

At step 404, process 400 (e.g., using one or more components described above) inputs the native code sample into an artificial intelligence model to generate an output. For example, the system may input the native code sample into an artificial intelligence model to generate a first output. The system's processing module may receive the transmitted native kernel data, including the native code sample and its description.

The artificial intelligence model may be trained to validate code samples based on labeled source content and labeled code samples. The labeled source content may comprise rulesets for security vulnerabilities that are extracted and reformatted from a plurality of sources. The labeled code samples may comprise a first subset of labeled code samples successfully validated against the rulesets and a second subset of labeled code samples unsuccessfully validated against the rulesets. For example, the system may gather a diverse set of labeled source content containing rulesets for security vulnerabilities. These rulesets should cover a broad range of potential vulnerabilities. The system collects labeled code samples categorized into two subsets: code samples that successfully pass validation against the rulesets and code samples that fail validation against the rulesets due to security vulnerabilities (or other criteria). For example, the system may initiate the validation process for the first model based on predefined criteria or validation procedures, which may involve running tests, simulations, and/or comparisons against expected outcomes or benchmarks to verify the model's accuracy, performance, and/or compliance with specified requirements.

The system may preprocess the labeled source content and code samples to extract relevant features. This might involve tokenization, parsing, and/or other techniques to represent the content in a format suitable for artificial intelligence analysis. The system may convert the labeled content and code samples into a suitable representation for the artificial intelligence model to understand and process, such as numerical vectors using techniques like word embeddings or TF-IDF (Term Frequency-Inverse Document Frequency). The system may choose an appropriate artificial intelligence model, such as machine learning classifiers (e.g., support vector machines, random forests, neural networks) suitable for the task of validating code samples against the provided rulesets. The system may determine a similarity (e.g., based on code sample characteristics) between the native code sample and the first subset of labeled code samples.

For example, the system may select the artificial intelligence model from a plurality of artificial intelligence models. For example, the system may select a particular model based on a similarity between the native kernel that is input and the training data for a given model. By doing so, the system may increase accuracy and reliability of a given output. The system may select the artificial intelligence model from a plurality of artificial intelligence models based on the similarity between the native code sample and the first subset of labeled code samples.

The system may then train the selected model using the labeled data rulesets as inputs and the labeled code samples as outputs. The model learns to predict whether a given code sample complies with the rulesets or contains vulnerabilities. The system may validate the trained model's performance using validation techniques such as cross-validation or splitting the dataset into training and testing sets. The system may use assessment metrics like accuracy, precision, recall, and/or F1 score to evaluate the model's performance. The system may iterate on the model by fine-tuning parameters, adjusting features, and/or trying different models to improve its accuracy and effectiveness in identifying security vulnerabilities in code samples. The system may deploy the trained model into the system's workflow for code validation. The system may test the model's performance in a real or simulated environment to ensure it effectively identifies security vulnerabilities in new, unseen code samples. The system may then continuously update the model as new labeled data becomes available or as the rulesets for security vulnerabilities evolve. The system may also monitor the model's performance in the production environment and make necessary adjustments to maintain its effectiveness.

At step 406, process 400 (e.g., using one or more components described above) filters the output based on the native kernel to generate a validation assessment. For example, the system may filter the first output based on the native kernel to generate a first validation assessment for the first model. If the native code sample is meant for execution, the system may compile the code using an appropriate compiler specific to the native language or platform. Alternatively, if the code sample is for interpretative purposes, the system may directly interpret and execute it.

In some embodiments, the system may generate copious amounts of code samples and descriptions. In order to generate concise responses, the system may filter an output based on the native kernel. For example, the native code sample and its description are preprocessed to extract meaningful features. This might involve tokenization, parsing, or encoding techniques to represent the code and its description in a format suitable for the artificial intelligence model. The preprocessed native kernel is fed into the artificial intelligence model that has been trained for validation assessments. This model might be specifically designed to evaluate code samples against certain criteria, such as adherence to coding standards, security checks, or other validation criteria derived from the native descriptions. The system may apply filters or criteria to the artificial intelligence model's output to determine the validation assessment. These filters might include keywords, threshold values, rulesets, and/or conditions that define what constitutes a successful or unsuccessful validation assessment (or characteristics thereof such as length, line numbers, required keywords, values, rulesets, functions, etc.) based on the generated output. This assessment could include a report, score, and/or classification indicating the degree of compliance or validation success against the native kernel's description.

For example, the system may generate platform descriptions corresponding to the native kernel. The system may then filter the plurality of platform descriptions based on the native description. In some embodiments, filtering the plurality of platform descriptions based on the native kernel may comprise the system parsing the native description to determine a native description characteristic. The system may then filter the plurality of platform descriptions based on the native description characteristic. As one example, parsing the native description to determine the native description characteristic may comprise determining a desired output corresponding to the native description characteristic and determining a platform output corresponding to the desired output for use in filtering the plurality of platform descriptions. As another example, parsing the native description to determine the native description characteristic may comprise determining an input data type corresponding to the native description characteristic and determining a platform data type corresponding to the input data type for use in filtering the plurality of platform descriptions. As yet another example, parsing the native description to determine the native description characteristic may comprise determining a security vulnerability category corresponding to the native description characteristic and determining a platform security vulnerability category corresponding to the security vulnerability category for use in filtering the plurality of platform descriptions.

In some embodiments, the system may generate copious amounts of code samples and descriptions. In order to generate concise responses, the system may filter an output based on the native kernel. For example, when filtering the first output based on the native kernel to generate the first validation assessment for the first model, the system may determine a plurality of platform code samples corresponding to the native kernel and filter the plurality of platform code samples based on the native code sample. In some embodiments, filtering the plurality of platform code samples based on the native kernel may comprise the system parsing the native code sample to determine a native code sample characteristic and filtering the plurality of platform code samples based on the native code sample characteristic. For example, parsing the native code sample to determine the native code sample characteristic may comprise the system determining a code function corresponding to the native code sample characteristic and determining a platform function corresponding to the code function for use in filtering the plurality of platform code samples. In another example, parsing the native code sample to determine the native code sample characteristic may comprise the system determining a security vulnerability corresponding to the native code sample characteristic and determining a platform security vulnerability corresponding to the security vulnerability for use in filtering the plurality of platform code samples. In another example, parsing the native code sample to determine the native code sample characteristic may comprise the system determining a naming convention corresponding to the native code sample characteristic and determining a platform naming convention corresponding to the naming convention for use in filtering the plurality of platform code samples.

In some embodiments, generating the first validation assessment for the first model further may comprise inputting the first output into a generative artificial intelligence model to generate a second output and generating a platform description based on the second output. For example, the system may gather a dataset comprising native descriptions from the source model and corresponding platform descriptions from the target model. These descriptions might include information about the architecture, features, functionalities, or any other relevant details specific to each model or platform. The system may preprocess the collected data, including tokenization, cleaning, and formatting, to prepare it for input into the generative artificial intelligence model. The system may select a generative artificial intelligence model capable of understanding and generating text in a way that captures the essence of the platform descriptions. Models like transformers, recurrent neural networks (RNNs), or sequence-to-sequence models may be suitable for this task. The system may train the chosen generative artificial intelligence model using the collected dataset, where the native descriptions serve as input and the corresponding platform descriptions act as the target output. By doing so, the generative artificial intelligence model learns the mapping or relationship between the native descriptions and platform descriptions during the training process. After the generative model is trained, the system may input a native description of a model into the trained model. The generative artificial intelligence model generates a platform description (or native code sample) based on its learned associations between the source (native) and target (platform) descriptions (or native code samples).

At step 408, process 400 (e.g., using one or more components described above) generates for display the validation assessment. For example, the system may generate for display, in the user interface, the first validation assessment. In some embodiments, the validation assessment may be presented to a user through the user interface, sent as notifications, and/or made available for access through appropriate channels. Users can review these results to understand the model's validation status and take necessary actions based on the findings. For example, upon successful compilation or execution, the system may generate an output, which could be visualizations, logs, and/or any relevant information derived from the native code's execution. This output might be presented to the user through the user interface for review and analysis. During compilation or execution, if errors or issues arise within the native code, the system may handle them based on predefined error handling routines. Feedback or error messages might be sent back to the user through the user interface, indicating where issues occurred within the code and/or its description.

In some embodiments, generating the first validation assessment for the first model may comprise selecting a platform template from a plurality of templates corresponding to the native kernel and generating the first validation assessment based on the platform template. For example, the system may define selection criteria based on the characteristics, requirements, or specific aspects of the source model's native kernel. Criteria might include the type of model, programming language, architecture, specific functionalities, or compliance with certain standards. The system may maintain a repository or library containing a variety of platform templates corresponding to different types of source models or development environments. Each template represents a standardized structure or framework for the target platform. The system may analyze the native kernel of the source model to understand its key attributes, components, architecture, or requirements. This analysis helps in identifying the most suitable platform template that aligns with the native kernel's characteristics. The system may compare the characteristics and requirements of the native kernel with the attributes of available platform templates. The system may use algorithms, rulesets, or similarity measures to match the native kernel with the most fitting platform template from the repository. Once the suitable platform template is selected, the system may integrate the source model's native kernel into the chosen template structure or framework. This integration involves mapping components, functionalities, or elements of the native kernel onto the corresponding sections or modules within the platform template. The system may utilize the integrated source model within the selected platform template to conduct validation assessments and/or execute predefined tests, checks, or validation procedures specified within the template to evaluate the compliance, performance, or adherence of the source model to the platform's standards or requirements. The system may analyze the results of the validation assessments performed within the platform template and assess the source model's strengths, weaknesses, adherence to guidelines, or any discrepancies identified during the validation process. The system may then generate comprehensive reports documenting the validation assessment results, highlighting areas of compliance or non-compliance with the platform template's standards. This documentation aids in understanding the validation outcomes and any necessary improvements or modifications required for the source model.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
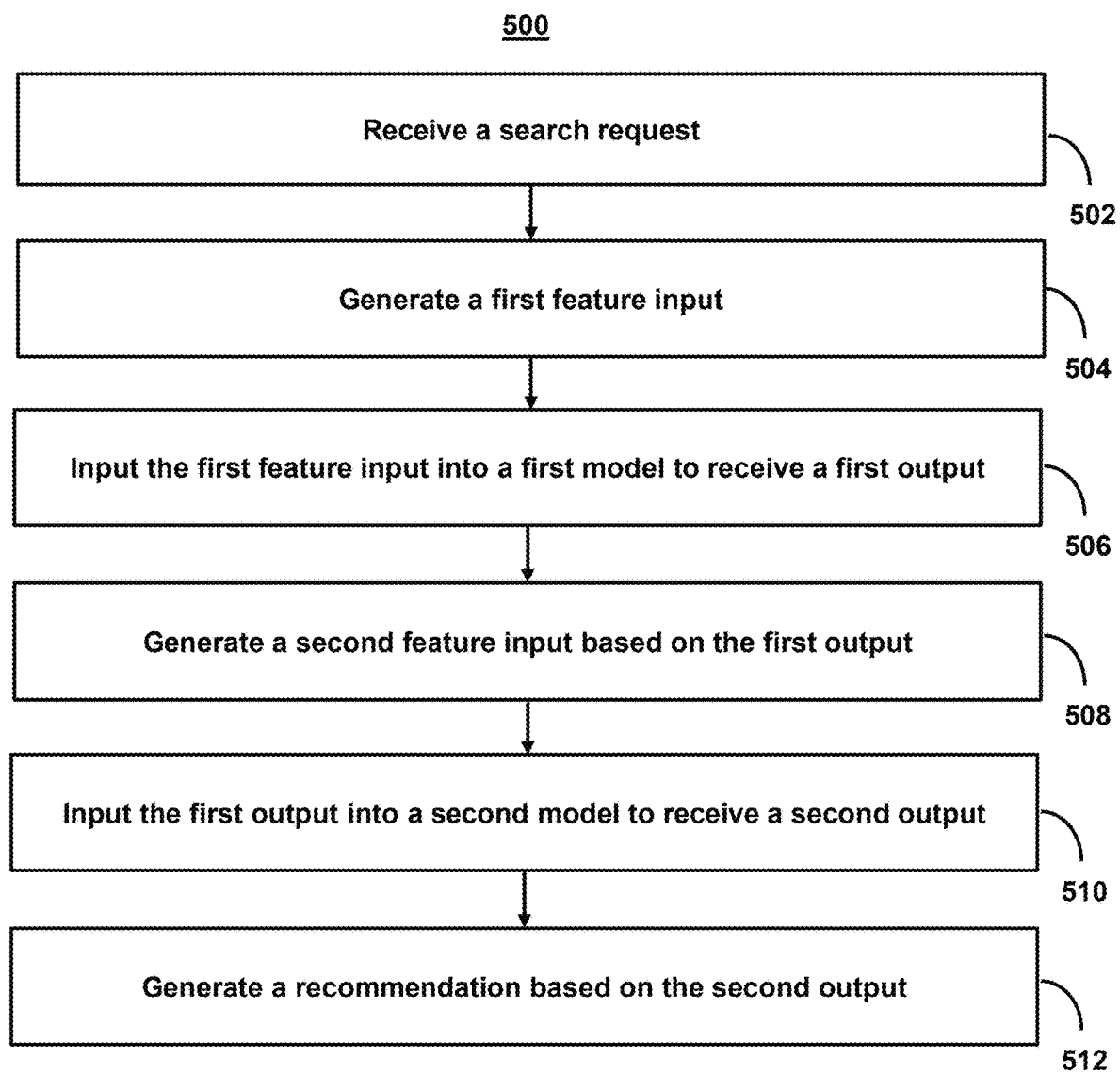
FIG. 5 shows a flowchart of the steps involved in searching and storing data over a computer network, in accordance with one or more embodiments.

FIG. 5 shows a flowchart of the steps involved in searching and storing data over a computer network, in accordance with one or more embodiments. For example, the system may use process 500 (e.g., as implemented on one or more system components described above) in order to facilitate searching and storing of code samples over a computer network.

In some embodiments, the system may generate a datastore (which may be encrypted) by receiving a plurality of secure applications, parsing the plurality of applications determine a plurality of labeled code samples, parsing the plurality of labeled code samples to determine labeled code sample characteristics corresponding to one or more of the plurality of labeled code samples, and encrypting the plurality of labeled code samples to generate a plurality of encrypted labeled code samples. For example, the system may generate a datastore—potentially encrypted—by performing a structured and secure processing pipeline on a plurality of received secure applications. First, the system receives the applications, which may consist of full software packages, source code repositories, or individual modules. It then parses these applications to extract meaningful segments of code, identifying and isolating a plurality of labeled code samples based on predefined criteria such as functionality, usage context, or programming constructs. Each labeled code sample is then further analyzed to determine its associated characteristics, such as algorithm type, performance properties, API usage, or domain relevance. These characteristics are used to tag or annotate the code samples, enabling structured indexing and feature-based comparisons in later stages. Once the labeled code samples and their corresponding characteristics have been determined, the system encrypts the code samples to ensure data security and privacy. This process generates a plurality of encrypted labeled code samples, which are then stored in a secure datastore. The encryption ensures that sensitive or proprietary code remains protected, while the labeled characteristics remain usable for secure querying, model training, or recommendation generation. This approach enables the system to build a searchable and privacy-preserving code repository that supports robust, feature-based operations while complying with data protection requirements.

At step 502, process 500 (e.g., using one or more components described above) receives a search request. For example, the system may receive, via a user interface, a first user input comprising a first search request for code samples in a datastore having a first characteristic. The system may receive, via a user interface, a first user input comprising a first search request for code samples in a datastore having a first characteristic by providing an interactive platform where users can submit queries through various input methods. The user interface may include a search bar, form fields, dropdown menus, or natural language input areas that allow the user to specify what type of code they are seeking. For example, a user might type a natural language request such as "Find Python code for training a decision tree," or select predefined options indicating the programming language, algorithm type, or application domain of interest. When the user submits the input, the system captures and processes it as a structured search request, identifying the relevant characteristic—such as "decision tree," "Python," or "model training"—that describes the type of code sample being requested. This input is then forwarded to the underlying system for feature extraction and comparison against stored code samples in the datastore. By enabling users to express their queries intuitively and flexibly through the interface, the system streamlines the search process and ensures that the user's intent is accurately translated into actionable search criteria.

In some embodiments, the system may receive the first user input by receiving native code sample for an application under development, determining that the native code sample comprises the first characteristic, and populating the first search request with the first characteristic based on determining that the native code sample comprises the first characteristic. For example, the system may receive the first user input by accepting a native code sample for an application under development through the user interface, either by direct upload, drag-and-drop, or pasting the code into an input field. Once the native code sample is received, the system performs automated analysis to parse and interpret its content, identifying structural and semantic elements such as functions, libraries, control flow, or algorithmic logic. During this process, the system determines whether the code sample exhibits a predefined characteristic—for example, it may detect that the code implements a machine learning algorithm, interacts with a database, or follows a specific architectural pattern. Upon determining that the code sample contains this first characteristic, the system automatically populates the first search request with it, effectively converting the user's code submission into a structured query. This automated extraction and classification relieve the user from manually specifying the search characteristic, making the system more intuitive and reducing the likelihood of user error. The populated search request can then be used to retrieve relevant code samples from the datastore that match the identified characteristic, enhancing the development process with intelligent code recommendations or documentation support.

In some embodiments, the system may receive the first user input by receiving native code for an application under development, determining a first code sample boundary in the native code, parsing a portion of the native code based on the first code sample boundary, and determining the first characteristic based on the portion. For example, the system may receive the first user input by accepting native code for an application under development, either through direct input or file upload via the user interface. Once the native code is received, the system analyzes it to determine a first code sample boundary, which defines a logical or functional segment of the code—such as a function, method, class, or script block—that can be isolated for further analysis. This boundary helps the system focus on a meaningful portion of the code, rather than processing the entire application at once. Using this boundary, the system parses the corresponding portion of the native code to extract relevant syntax, structure, and semantic information. Based on this extracted portion, the system identifies a first characteristic—for example, detecting that the code performs data preprocessing, implements a neural network, or handles encryption routines. This characteristic is then used to automatically populate the first search request, effectively converting the parsed native code segment into a feature-based query. By identifying and analyzing code within specific boundaries, the system ensures more accurate characterization and facilitates precise, context-aware code retrieval from the datastore.

In some embodiments, the system may receive the first user input by receiving native code for an application under development, determining a first containerized portion in the native code, and parsing the first containerized portion to determine the first characteristic. For example, the system may receive the first user input by accepting native code for an application under development, typically through an upload or direct input via a user interface. Upon receiving the code, the system analyzes it to identify a first containerized portion, which refers to a self-contained module or unit within the code that encapsulates specific functionality—such as a function, class, microservice, or containerized component in a Docker environment. This containerized portion is recognized based on structural cues, modular definitions, or configuration markers that denote boundaries between logically separated components. Once the system isolates this portion, it proceeds to parse its contents to analyze syntax, logic flow, dependencies, and API usage. Through this analysis, the system determines a first characteristic that describes the purpose or behavior of the containerized code—for example, identifying it as a data ingestion module, a machine learning inference engine, or an API handler. This characteristic is then used to automatically populate the first search request, enabling the system to query a datastore for similar or complementary code samples. By focusing on containerized portions, the system improves the accuracy and relevance of the search process while aligning with modern software architectures that emphasize modular and reusable components.

In some embodiments, the system may receive the first user input by receiving a native code sample for an application under development, determining a code dependency in the native code sample, and determining the first characteristic based on the code dependency. For example, the system may receive the first user input by accepting a native code sample for an application under development through a user interface, such as a code editor, upload field, or API endpoint. After receiving the code sample, the system analyzes it to identify code dependencies, which may include imported libraries, external modules, frameworks, or packages that the code relies on to function. This analysis involves parsing the code to detect import statements, configuration files, or package declarations that indicate specific technologies or tools being used. Once a code dependency is identified—for example, the use of TensorFlow for machine learning, Flask for web services, or Pandas for data manipulation—the system uses this dependency information to infer a first characteristic about the code sample. This characteristic may relate to the code's domain (e.g., data science, web development), functionality (e.g., neural network modeling, REST API handling), or execution environment (e.g., Python-based data pipeline). The system then uses this characteristic to automatically populate the first search request, enabling it to retrieve code samples from a datastore that are functionally or contextually similar. By leveraging dependency analysis, the system provides a more intelligent and automated way to generate relevant search queries without requiring the user to explicitly define the code's purpose.

In some embodiments, the system may receive the first user input by receiving native code for an application under development, performing a runtime analysis of the native code in a sandbox environment, and determining the first characteristic based on the runtime analysis. For example, the system may receive the first user input by accepting native code for an application under development and then performing a runtime analysis of that code within a controlled sandbox environment. Once the code is submitted—via a user interface or automated pipeline—the system executes it in isolation to observe its behavior during runtime without risking interference with other systems or compromising security. During this execution, the system monitors key aspects such as API calls, memory usage, data flow, external service interactions, and functional outputs. By capturing these dynamic behaviors, the system can analyze how the code actually operates in practice, rather than relying solely on static syntax. Based on the insights gathered during this runtime analysis, the system determines a first characteristic—for example, recognizing that the code performs real-time data processing, communicates with cloud-based APIs, or executes machine learning inference.

This characteristic is then used to populate the first search request, allowing the system to query a datastore for related code samples that share similar behavioral traits. Leveraging runtime analysis in a sandbox environment enables the system to make more accurate, execution-based assessments of the code's functionality, improving the precision and context-awareness of the generated search input.

In some embodiments, the system may receive the first user input by receiving a native code sample for an application under development, tokenizing the native code sample to generate a token representation, determining a syntax tree based on the token representation, and determining the first characteristic based on the syntax tree. For example, the system may receive the first user input by accepting a native code sample for an application under development, which is submitted through a user interface or programmatic input. Once the code is received, the system begins by tokenizing the native code sample—breaking it down into individual elements such as keywords, identifiers, operators, and literals—to create a token representation that reflects the fundamental building blocks of the code. Using this tokenized format, the system constructs a syntax tree (also known as an abstract syntax tree or AST), which organizes the tokens into a hierarchical structure representing the grammatical and logical relationships within the code. This syntax tree provides a deeper understanding of the code's structure, including function definitions, control flows, class hierarchies, and data manipulations. The system then analyzes this syntax tree to determine a first characteristic, such as the type of algorithm implemented, the presence of recursive logic, or the use of object-oriented patterns. This characteristic is used to automatically populate the first search request, enabling the system to search a code repository for samples with similar structural features. By leveraging syntax trees derived from tokenized code, the system can accurately identify the intent and design of the code sample, improving the relevance and precision of code search and recommendation processes.

In some embodiments, the system may receive the first user input by receiving a native code sample for an application under development, determining a naming convention in the native code sample, and determining the first characteristic based on the naming convention. For example, the system may receive the first user input by accepting a native code sample for an application under development and analyzing it to identify patterns in the naming convention used within the code. After receiving the code—through a user interface or automated input channel—the system parses it to extract identifiers such as variable names, function names, class names, and file names. It then evaluates these names to detect stylistic or semantic patterns that suggest specific programming practices, frameworks, or domains. For example, camelCase naming might indicate JavaScript or Java conventions, while snake_case may point to Python usage. Additionally, domain-specific prefixes or suffixes in function or variable names (e.g., predict_, load_data, or auth_) can signal the functional purpose of code segments. Based on this analysis, the system determines a first characteristic-such as the application domain (e.g., machine learning, data ingestion, authentication), programming language, or adherence to a particular design pattern. This characteristic is then used to automatically populate the first search request, enabling the system to find code samples in the datastore that exhibit similar structural or semantic characteristics. By leveraging naming conventions as a lightweight but informative signal, the system can infer meaningful attributes of the code and improve the efficiency and relevance of the code discovery process.

At step 504, process 500 (e.g., using one or more components described above) generates a first feature input. For example, the system may generate a first feature input based on the first search request. The system may generate a first feature input based on the first search request by analyzing the content and structure of the request to extract relevant technical and contextual elements that define what the user is seeking. This process begins with parsing the search request—whether it is entered as natural language, structured form data, or derived from a code sample—to identify key characteristics, such as the desired functionality, programming language, algorithm type, domain context, or dependencies. The system then maps these extracted elements to a set of predefined or learned features that represent meaningful dimensions for comparison within a code sample repository. These features may include syntactic structures, functional behaviors, API usage patterns, or metadata tags. The system encodes this information into a structured, machine-readable format—such as a feature vector or embedding—which constitutes the first feature input. This input is then used by the model to perform a feature-based comparison against labeled code samples in the datastore. By translating the search request into a rich, multi-dimensional feature representation, the system enables precise and context-aware retrieval of relevant code samples, even in environments with diverse coding standards and decentralized architectures.

In some embodiments, the system may input the first feature input into the first model to receive the first output by determining a first code function corresponding to the first characteristic and comparing the first code function to a labeled code function corresponding to the first labeled characteristic. For example, the system may input the first feature input into the first model to receive the first output by first determining a first code function within the input that corresponds to the first characteristic identified in the user's search request. This code function represents a functional unit of the user's input—such as a method or module—that embodies the intended behavior, algorithm, or pattern being sought. The system then uses the first model, which has been trained on a large dataset of labeled code samples, to compare this first code function against a set of labeled code functions that each correspond to a first labeled characteristic in the datastore. These labeled functions are annotated with characteristics such as algorithm type, functionality, or domain relevance. The model performs a semantic and structural comparison between the input code function and the labeled code functions, identifying similarities in control flow, logic, syntax, and feature embeddings. Based on this comparison, the model generates the first output, which identifies one or more labeled code samples that exhibit the same or closely related characteristics as the input function. This approach enables the system to match user input to relevant code not through superficial text matching, but through deep structural and behavioral similarities, improving the precision and interpretability of the search results.

In some embodiments, the system may input the first feature input into the first model to receive the first output by determining a data value corresponding to the first characteristic and comparing the data value to a plurality of data values in the labeled code sample. For example, the system may input the first feature input into the first model to receive the first output by first determining a data value that corresponds to the first characteristic identified in the user's search request. This data value may represent a measurable or encoded representation of a code attribute—such as a numerical embedding, feature vector, or categorical label—that encapsulates the essence of the characteristic, such as "uses a decision tree algorithm," "performs data preprocessing," or "interacts with a database." The system then inputs this data value into the first model, which has been trained to compare such values against a plurality of data values previously derived from labeled code samples in the datastore. Each of these labeled samples has associated data values that represent their unique characteristics, allowing the model to perform a similarity comparison between the input data value and the stored set. The model evaluates which labeled code samples most closely align with the input, based on their shared or similar data characteristics, and generates the first output—a set of recommended or matching code samples. This approach enables the system to perform highly scalable and consistent comparisons using abstracted, standardized representations of code characteristics, supporting more accurate and feature-driven retrieval even across heterogeneous and decentralized code environments.

In some embodiments, the system may input the first feature input into the first model to receive the first output by determining a similarity between the first characteristic and the first labeled characteristic and comparing the similarity to a threshold similarity. For example, the system may input the first feature input into the first model to receive the first output by first determining a similarity between the first characteristic—extracted from the user's input—and a first labeled characteristic associated with one or more labeled code samples in the datastore. This similarity can be computed using a variety of techniques, such as cosine similarity, Euclidean distance, or learned embeddings generated by machine learning models that represent the semantic and functional relationships between code characteristics. Once the similarity score between the input characteristic and each labeled characteristic is calculated, the system compares these scores to a predefined threshold similarity value. Only those labeled code samples with similarity scores that meet or exceed this threshold are considered sufficiently relevant and included in the first output. This threshold comparison acts as a filter to ensure that the returned results maintain a minimum standard of relevance and alignment with the user's intent. By applying this method, the system ensures that only the most functionally or semantically similar code samples are recommended, improving the accuracy, quality, and trustworthiness of the search results.

In some embodiments, the system may input the first feature input into the first model to receive the first output by determining a first data source for a native code sample corresponding to the first characteristic and comparing the first data source to a labeled data source corresponding to the first labeled characteristic. For example, the system may input the first feature input into the first model to receive the first output by first identifying a first data source associated with a native code sample that corresponds to the first characteristic of interest. This data source could refer to a specific dataset, file type, API endpoint, or database that the code interacts with or processes. The system analyzes the native code to detect how and where data is accessed or ingested, using techniques such as static analysis, dependency tracking, or pattern recognition to determine the origin or format of the data. Once the first data source is identified, the system compares it to a labeled data source associated with one or more labeled code samples in the datastore, each of which includes metadata indicating the types of data sources they utilize. The model evaluates the similarity or relevance between the user's data source and the labeled ones—considering factors such as source type, structure, schema, or domain—and uses this comparison to generate the first output, which includes code samples linked to similar data handling behaviors. By incorporating data source context into the comparison process, the system improves its ability to surface code that not only matches on algorithmic or structural levels, but also aligns with the user's real-world data environment, thus enhancing relevance and applicability.

At step 506, process 500 (e.g., using one or more components described above) inputs the first feature input into a first model to receive a first output. For example, the system may input the first feature input into a first model to receive a first output, wherein the first output comprises a labeled code sample comprising a first labeled characteristic that corresponds to the first characteristic, and wherein the first model is trained to compare code sample characteristics described by inputted first features inputs to labeled code sample characteristics corresponding to one or more of a plurality of labeled code samples to generate outputs identifying one or more of the plurality of labeled code samples.

The system may input the first feature input into a first model to receive a first output by first encoding the feature input—representing the user's search request or extracted code characteristics—into a structured format suitable for model processing, such as a feature vector or embedding. This feature input describes one or more characteristics of interest, such as functionality, algorithm type, data interaction patterns, or application domain. The first model, which has been trained on a large corpus of labeled code samples, uses this input to perform a comparison between the inputted characteristics and the labeled code sample characteristics stored in the model's training data. Each labeled code sample in the dataset is associated with one or more annotated features that describe its structure, behavior, or usage context. The model evaluates the similarity between the feature input and these labeled characteristics using learned metrics or similarity functions. It then generates the first output, which comprises one or more labeled code samples, each of which includes a first labeled characteristic that corresponds to the first characteristic identified in the user's input. This output reflects the code samples that are most aligned—functionally or semantically—with the user's intent. By relying on feature-based matching rather than simple text or keyword similarity, the model supports more accurate and context-aware retrieval, allowing users to discover relevant code samples even in diverse, heterogeneous repositories.

At step 508, process 500 (e.g., using one or more components described above) generates a second feature input based on the first output. For example, the system may generate a second feature input based on the first output. The system may generate a second feature input based on the first output by analyzing the labeled code sample or samples returned in the first output, particularly focusing on the first labeled characteristic that matched the user's original intent. This process involves extracting additional context, metadata, and structural elements from the labeled code sample—such as function names, variable usage, programming constructs, comments, dependencies, and any associated descriptive labels. These elements are then used to construct a second feature input, which represents a more refined and contextualized understanding of the code sample identified in the first output. The second feature input may include details specifically tailored for downstream processing, such as generating human-readable descriptions, identifying related documentation, or performing further validation. In some implementations, the system may also use templates or transformation models to map key elements of the labeled code sample into a structured format suitable for use by a second model. This enables the system to carry forward the insights gained from the initial feature-based comparison, while adapting them for more advanced analysis or output generation. Overall, generating a second feature input based on the first output allows the system to maintain continuity between stages and supports multi-step workflows, such as recommendation refinement, documentation creation, or explainability enhancement.

At step 510, process 500 (e.g., using one or more components described above) inputs the first output into a second model to receive a second output. For example, the system may input the first output into a second model to receive a second output, wherein the second output comprises a human-readable description of the labeled code sample, and wherein the second model is trained to generate descriptions related to the labeled code sample characteristics of the one or more of the plurality of labeled code samples identified by feature based on inputted second feature inputs. The system may input the first output into a second model to receive a second output by using the labeled code sample—returned in the first output—as the basis for generating a descriptive, natural language explanation. To begin, the system extracts relevant elements from the labeled code sample, including its structure, functionality, and metadata, and converts these into a second feature input. This input captures high-level characteristics such as algorithm type, input-output behavior, code purpose, or domain-specific usage, which are used to guide the generation of a description. The second model, which is trained specifically to produce human-readable content, receives this second feature input and uses it to generate the second output—a detailed, plain-language summary or explanation of the labeled code sample. The model is trained on a large dataset of code and corresponding descriptions, enabling it to learn how to translate technical features into coherent and informative narratives. These descriptions are aligned with the labeled code sample characteristics, ensuring that the output is both accurate and contextually relevant. By leveraging this two-stage process, the system not only identifies relevant code but also enhances usability and transparency by explaining the code's purpose in a format that is accessible to both technical and non-technical users.

In some embodiments, the system may input the first output into the second model to receive the second output by determining a first term in the labeled code sample, selecting a second term from a standardized taxonomy for the datastore corresponding to the first term, and determining the human-readable description based on the second term. The system may input the first output into the second model to receive the second output by first examining the labeled code sample contained in the first output and identifying a first term within it that reflects a key concept, such as a function name, variable, class, or keyword that suggests the code's purpose or behavior. Once this term is identified, the system cross-references it with a standardized taxonomy that has been predefined for the datastore. This taxonomy includes a structured set of terms and categories used to consistently label and describe different types of code functionality, algorithms, or domains. The system then selects a second term from the taxonomy that corresponds to the meaning or intent of the first term—essentially mapping potentially ambiguous or custom naming conventions in the original code to standardized, interpretable terminology. Using this second term, which carries a well-defined and domain-aligned meaning, the system constructs a human-readable description of the labeled code sample. This description serves as the second output, ensuring that the summary is not only clear and accurate, but also consistent with the terminology and labeling standards used throughout the datastore. This process improves interpretability, supports alignment with documentation and governance standards, and enhances the usefulness of the code search and recommendation system for diverse users.

In some embodiments, the system may input the first output into the second model to receive the second output by determining metadata describing the labeled code sample, generating a prompt for the second model based on the first output and the metadata, and inputting the prompt into the second model. For example, the system may input the first output into the second model to receive the second output by first analyzing the labeled code sample contained in the first output and extracting metadata that describes key aspects of the sample. This metadata can include information such as the code's functional purpose, programming language, associated libraries, application domain, performance characteristics, and labeled features from the datastore. Using both the metadata and the content of the labeled code sample, the system generates a prompt specifically formatted for the second model. This prompt serves as an instruction or query that guides the second model in producing a meaningful, human-readable description of the code sample. The prompt may be constructed using a structured template that integrates the labeled code, associated characteristics, and metadata to ensure that the model has sufficient context to generate an accurate and relevant output. Once the prompt is complete, the system inputs it into the second model, which is trained to understand and convert such structured prompts into natural language explanations. The model then generates the second output, which is a readable and informative description of the code's purpose or behavior. This approach ensures that the output is contextually aligned with both the content of the code and the standardized characteristics used across the system, improving consistency, clarity, and user comprehension.

In some embodiments, the system may input the first output into the second model to receive the second output by identifying a first portion and a second portion of the labeled code sample, weighting the first portion and the second portion based on a first criterion to determine a first weighted portion and a second weighted portion, and determining the human-readable description based on the first weighted portion and the second weighted portion. For example, the system may system may input the first output into the second model to receive the second output by first identifying a first portion and a second portion of the labeled code sample. These portions could represent different logical or functional segments of the code, such as function definitions, initialization blocks, data handling sections, or comments. Once the portions are identified, the system applies a first criterion—such as relevance to the user's query, frequency of use, semantic importance, or presence of key operations—to assign weights to each portion. This results in a first weighted portion and a second weighted portion, with each reflecting its relative importance or contribution to the overall behavior of the code. The system then uses these weighted portions to construct a more focused and contextually meaningful representation of the code sample. This representation serves as input to the second model, which is trained to generate human-readable descriptions. By prioritizing the most relevant or functionally significant parts of the code, the system ensures that the second output—a natural language explanation of the code—is both accurate and informative. This weighting strategy helps the model emphasize the core logic or most instructive aspects of the code sample, improving the clarity and usefulness of the generated description for end users.

At step 512, process 500 (e.g., using one or more components described above) generates a recommendation based on the second output. For example, the system may generate for display, in the user interface, a first recommendation based on the second output. The system may generate for display, in the user interface, a first recommendation based on the second output by first analyzing the human-readable description produced by the second model. This description provides a clear and interpretable summary of the labeled code sample's functionality, structure, or purpose. The system then formats this output into a user-friendly recommendation, which may include not only the descriptive explanation but also the corresponding code sample, its labeled characteristics, and any relevant metadata such as the programming language, applicable use cases, or performance considerations. The recommendation may also be enhanced with actionable options, such as buttons to copy the code, links to related samples, or suggestions for integration based on the user's original input. Once compiled, the recommendation is rendered within the user interface, allowing the user to easily review and interact with it. This process transforms the abstract model-generated content into a practical, accessible format that supports informed decision-making, accelerates development, and helps users quickly identify and apply relevant solutions. By presenting the recommendation in a structured and visually clear manner, the system ensures that complex technical information is both digestible and actionable.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for streamlining risk modeling in software development using natively sourced kernels or searching and storing data over a secured computer network.
2. The method of the preceding embodiment, further comprising: receiving, via a user interface, a first user input comprising a validation request for a first model, wherein the first model corresponds to a first software development project; receiving, via the user interface, a second user input comprising a native kernel for the first model, wherein the native kernel comprises a native code sample and a native description of the native code sample; inputting the native code sample into an artificial intelligence model to generate a first output, wherein the artificial intelligence model is trained to validate code samples based on labeled source content and labeled code samples, wherein the labeled source content comprises rulesets for security vulnerabilities that are extracted and reformatted from a plurality of sources, and wherein the labeled code samples comprise a first subset of labeled code samples successfully validated against the rulesets and a second subset of labeled code samples unsuccessfully validated against the rulesets; filtering the first output based on the native kernel to generate a first validation assessment for the first model; and generating for display, in the user interface, the first validation assessment.
3. The method of any one of the preceding embodiments, wherein filtering the first output based on the native kernel to generate the first validation assessment for the first model further comprises: determining a plurality of platform descriptions corresponding to the native kernel; and filtering the plurality of platform descriptions based on the native description.
4. The method of any one of the preceding embodiments, wherein filtering the plurality of platform descriptions based on the native kernel further comprises: parsing the native description to determine a native description characteristic; and filtering the plurality of platform descriptions based on the native description characteristic.
5. The method of any one of the preceding embodiments, wherein parsing the native description to determine the native description characteristic further comprises: determining a desired output corresponding to the native description characteristic; and determining a platform output corresponding to the desired output for use in filtering the plurality of platform descriptions.
6. The method of any one of the preceding embodiments, wherein parsing the native description to determine the native description characteristic further comprises: determining an input data type corresponding to the native description characteristic; and determining a platform data type corresponding to the input data type for use in filtering the plurality of platform descriptions.
7. The method of any one of the preceding embodiments, wherein parsing the native description to determine the native description characteristic further comprises: determining a security vulnerability category corresponding to the native description characteristic; and determining a platform security vulnerability category corresponding to the security vulnerability category for use in filtering the plurality of platform descriptions.
8. The method of any one of the preceding embodiments, wherein filtering the first output based on the native kernel to generate the first validation assessment for the first model further comprises: determining a plurality of platform code samples corresponding to the native kernel; and filtering the plurality of platform code samples based on the native code sample.
9. The method of any one of the preceding embodiments, wherein filtering the plurality of platform code samples based on the native kernel further comprises: parsing the native code sample to determine a native code sample characteristic; and filtering the plurality of platform code samples based on the native code sample characteristic.

10. The method of any one of the preceding embodiments, wherein parsing the native code sample to determine the native code sample characteristic further comprises: determining a code function corresponding to the native code sample characteristic; and determining a platform function corresponding to the code function for use in filtering the plurality of platform code samples.

11. The method of any one of the preceding embodiments, wherein parsing the native code sample to determine the native code sample characteristic further comprises: determining a security vulnerability corresponding to the native code sample characteristic; and determining a platform security vulnerability corresponding to the security vulnerability for use in filtering the plurality of platform code samples.

12. The method of any one of the preceding embodiments, wherein parsing the native code sample to determine the native code sample characteristic further comprises: determining a naming convention corresponding to the native code sample characteristic; and determining a platform naming convention corresponding to the naming convention for use in filtering the plurality of platform code samples.

13. The method of any one of the preceding embodiments, further comprising: determining a similarity between the native code sample and the first subset of labeled code samples; and selecting the artificial intelligence model from a plurality of artificial intelligence models based on the similarity between the native code sample and the first subset of labeled code samples.

14. The method of any one of the preceding embodiments, wherein generating the first validation assessment for the first model further comprises: inputting the first output into a generative artificial intelligence model to generate a second output; and generating a platform description based on the second output.

15. The method of any one of the preceding embodiments, wherein generating the first validation assessment for the first model further comprises: selecting a platform template from a plurality of templates corresponding to the native kernel; and generating the first validation assessment based on the platform template.

16. The method of any one of the preceding embodiments, further comprising: receiving, via a user interface, a first user input comprising a first search request for code samples in a datastore having a first characteristic; generating a first feature input based on the first search request; inputting the first feature input into a first model to receive a first output, wherein the first output comprises a labeled code sample comprising a first labeled characteristic that corresponds to the first characteristic, and wherein the first model is trained to compare code sample characteristics described by inputted first features inputs to labeled code sample characteristics corresponding to one or more of a plurality of labeled code samples to generate outputs identifying one or more of the plurality of labeled code samples; generating a second feature input based on the first output; inputting the first output into a second model to receive a second output, wherein the second output comprises a human-readable description of the labeled code sample, and wherein the second model is trained to generate descriptions related to the labeled code sample characteristics of the one or more of the plurality of labeled code samples identified by feature based on inputted second feature inputs; and generating for display, in the user interface, a first recommendation based on the second output.

17. The method of any one of the preceding embodiments, wherein receiving the first user input further comprises: receiving native code sample for an application under development; determining that the native code sample comprises the first characteristic; and populating the first search request with the first characteristic based on determining that the native code sample comprises the first characteristic.

18. The method of any one of the preceding embodiments, wherein receiving the first user input further comprises: receiving native code for an application under development; determining a first code sample boundary in the native code; parsing a portion of the native code based on the first code sample boundary; and determining the first characteristic based on the portion.

19. The method of any one of the preceding embodiments, wherein receiving the first user input further comprises: receiving native code for an application under development; determining a first containerized portion in the native code; and parsing the first containerized portion to determine the first characteristic.

20. The method of any one of the preceding embodiments, wherein receiving the first user input further comprises: receiving a native code sample for an application under development; determining a code dependency in the native code sample; and determining the first characteristic based on the code dependency.

21. The method of any one of the preceding embodiments, wherein receiving the first user input further comprises: receiving native code for an application under development; performing a runtime analysis of the native code in a sandbox environment; and determining the first characteristic based on the runtime analysis.

22. The method of any one of the preceding embodiments, wherein receiving the first user input further comprises: receiving a native code sample for an application under development; tokenizing the native code sample to generate a token representation; determining a syntax tree based on the token representation; and determining the first characteristic based on the syntax tree.

23. The method of any one of the preceding embodiments, wherein receiving the first user input further comprises: receiving a native code sample for an application under development; determining a naming convention in the native code sample; and determining the first characteristic based on the naming convention.

24. The method of any one of the preceding embodiments, wherein inputting the first feature input into the first model to receive the first output further comprises: determining a first code function corresponding to the first characteristic; and comparing the first code function to a labeled code function corresponding to the first labeled characteristic.

25. The method of any one of the preceding embodiments, wherein inputting the first feature input into the first model to receive the first output further comprises: determining a data value corresponding to the first characteristic; and comparing the data value to a plurality of data values in the labeled code sample.

26. The method of any one of the preceding embodiments, wherein inputting the first feature input into the first model to receive the first output further comprises: determining a similarity between the first characteristic and the first labeled characteristic; and comparing the similarity to a threshold similarity.

27. The method of any one of the preceding embodiments, wherein inputting the first feature input into the first model to receive the first output further comprises: determining a first data source for a native code sample corresponding to the first characteristic; and comparing the first data source to a labeled data source corresponding to the first labeled characteristic.

28. The method of any one of the preceding embodiments, wherein inputting the first output into the second model to receive the second output further comprises: determining a first term in the labeled code sample; selecting a second term from a standardized taxonomy for the datastore corresponding to the first term; and determining the human-readable description based on the second term.

29. The method of any one of the preceding embodiments, wherein inputting the first output into the second model to receive the second output further comprises: determining metadata describing the labeled code sample; generating a prompt for the second model based on the first output and the metadata; and inputting the prompt into the second model.

30. The method of any one of the preceding embodiments, wherein inputting the first output into the second model to receive the second output further comprises: identifying a first portion and a second portion of the labeled code sample; weighting the first portion and the second portion based on a first criterion to determine a first weighted portion and a second weighted portion; and determining the human-readable description based on the first weighted portion and the second weighted portion.

31. The method of any one of the preceding embodiments, further comprising: receiving a plurality of applications; parsing the plurality of applications determine the plurality of labeled code samples; parsing the plurality of labeled code samples to determine one or more labeled code sample characteristics corresponding to one or more of the plurality of labeled code samples; and populating the datastore with the plurality of labeled code samples and the labeled code sample characteristics.

32. A tangible, non-transitory, computer-readable medium storing instructions that, when executed by a data processing apparatus, cause the data processing apparatus to perform operations comprising those of any of embodiments 1-31.

33. A system comprising one or more processors; and memory storing instructions that, when executed by the processors, cause the processors to effectuate operations comprising those of any of embodiments 1-31.

34. A system comprising means for performing any of embodiments 1-31.

What is claimed is:

1. A system for searching and storing data over a secured computer network, the system comprising:
one or more hardware processors; and
one or more computer-readable media comprising instructions recorded thereon that when executed by the one or more hardware processors cause operations comprising:
generating an encrypted datastore by:
receiving a plurality of secure applications;
parsing the plurality of secure applications determine a plurality of labeled code samples;
parsing the plurality of labeled code samples to determine labeled code sample characteristics corresponding to one or more of the plurality of labeled code samples; and
encrypting the plurality of labeled code samples to generate a plurality of encrypted labeled code samples;
receiving, via a user interface, a first user input comprising a first search request for code samples in the encrypted datastore that have a first characteristic;
generating a first encrypted feature input based on the first search request;
inputting the first encrypted feature input into a first trained model to receive a first encrypted output, wherein the first trained model compares code sample characteristics described by inputted first features inputs to the labeled code sample characteristics corresponding to one or more of the plurality of encrypted labeled code samples to generate outputs identifying one or more of the plurality of encrypted labeled code samples;
generating a second encrypted feature input based on the first encrypted output;
inputting the first encrypted output into a second trained model to receive a second encrypted output, wherein the second trained model generates human-readable descriptions related to the labeled code sample characteristics of the one or more of the plurality of labeled code samples identified by feature based on inputted second feature inputs; and
generating for display, in the user interface, a first recommendation of results corresponding to the first search request based on the second encrypted output, wherein the first recommendation is unencrypted.

2. A method for searching and storing data over a computer network, the method comprising:
accessing a datastore populated by:
receiving a plurality of applications;
parsing the plurality of applications determine a plurality of labeled code samples; and
parsing the plurality of labeled code samples to determine labeled code sample characteristics corresponding to one or more of the plurality of labeled code samples;
receiving, via a user interface, a first user input comprising a first search request for code samples in the datastore having that have a first characteristic;
generating a first feature input based on the first search request;
inputting the first feature input into a first trained model to receive a first output, wherein the first output comprises a labeled code sample comprising a first labeled characteristic that corresponds to the first characteristic, and wherein the first trained model compares code sample characteristics described by inputted first features inputs to the labeled code sample characteristics corresponding to one or more of h plurality of labeled code samples to generate outputs identifying one or more of the plurality of labeled code samples;
generating a second feature input based on the first output;
inputting the first output into a second trained model to receive a second output, wherein the second output comprises a human-readable description of the labeled code sample, and wherein the second trained model generates descriptions related to the labeled code sample characteristics of the one or more of the plurality of labeled code samples identified by feature based on inputted second feature inputs; and generating for display, in the user interface, a first recommendation of results corresponding to the first search request based on the second output.

3. The method of claim 2, wherein the receiving of the first user input further comprises:

receiving native code sample for an application under development;

determining that the native code sample comprises the first characteristic; and populating the first search request with the first characteristic based on determining that the native code sample comprises the first characteristic.

4. The method of claim 2, wherein the receiving of the first user input further comprises:

receiving native code for an application under development;

determining a first code sample boundary in the native code;

parsing a portion of the native code based on the first code sample boundary; and determining the first characteristic based on the portion.

5. The method of claim 2, wherein the receiving of the first user input further comprises:

receiving native code for an application under development;

determining a first containerized portion in the native code; and parsing the first containerized portion to determine the first characteristic.

6. The method of claim 2, wherein the receiving of the first user input further comprises:

receiving a native code sample for an application under development;

determining a code dependency in the native code sample; and determining the first characteristic based on the code dependency.

7. The method of claim 2, wherein the receiving of the first user input further comprises:

receiving native code for an application under development;

performing a runtime analysis of the native code in a sandbox environment; and determining the first characteristic based on the runtime analysis.

8. The method of claim 2, wherein the receiving of the first user input further comprises:

receiving a native code sample for an application under development;

tokenizing the native code sample to generate a token representation;

determining a syntax tree based on the token representation; and determining the first characteristic based on the syntax tree.

9. The method of claim 2, wherein the receiving of the first user input further comprises:

receiving a native code sample for an application under development;

determining a naming convention in the native code sample; and determining the first characteristic based on the naming convention.

10. The method of claim 2, wherein the inputting of the first feature input into the first trained model to receive the first output further comprises:

determining a first code function corresponding to the first characteristic; and comparing the first code function to a labeled code function corresponding to the first labeled characteristic.

11. The method of claim 2, wherein the inputting of the first feature input into the first trained model to receive the first output further comprises:

determining a data value corresponding to the first characteristic; and comparing the data value to a plurality of data values in the labeled code sample.

12. The method of claim 2, wherein the inputting of the first feature input into the first trained model to receive the first output further comprises:

determining a similarity between the first characteristic and the first labeled characteristic; and comparing the similarity to a threshold similarity.

13. The method of claim 2, wherein the inputting of the first feature input into the first trained model to receive the first output further comprises:

determining a first data source for a native code sample corresponding to the first characteristic; and comparing the first data source to a labeled data source corresponding to the first labeled characteristic.

14. The method of claim 2, wherein the inputting of the first output into the second trained model to receive the second output further comprises:

determining a first term in the labeled code sample;

selecting a second term from a standardized taxonomy for the datastore corresponding to the first term; and determining the human-readable description based on the second term.

15. The method of claim 2, wherein the inputting of the first output into the second trained model to receive the second output further comprises:

determining metadata describing the labeled code sample;

generating a prompt for the second trained model based on the first output and the metadata; and inputting the prompt into the second trained model.

16. The method of claim 2, wherein the inputting of the first output into the second trained model to receive the second output further comprises:

identifying a first portion and a second portion of the labeled code sample;

weighting the first portion and the second portion based on a first criterion to determine a first weighted portion and a second weighted portion; and determining the human-readable description based on the first weighted portion and the second weighted portion.

17. One or more non-transitory, computer-readable media comprising instructions recorded thereon that when executed by one or more processors cause operations comprising:

receiving a plurality of applications;

parsing the plurality of applications determine a plurality of labeled code samples;

parsing the plurality of labeled code samples to determine labeled code sample characteristics corresponding to one or more of the plurality of labeled code samples;

populating a datastore with the plurality of labeled code samples and the labeled code sample characteristics;

receiving, via a user interface, a first user input comprising a request for code samples in the datastore corresponding to a native code sample;

generating a first feature input based on the request;

inputting the first feature input into a first trained model to receive a first output, wherein the first output comprises a labeled code sample comprising a first labeled characteristic, and wherein the first trained model compares code sample characteristics described by inputted first features inputs to labeled code sample characteristics corresponding to one or more of a plurality of labeled code samples to generate outputs identifying one or more of the plurality of labeled code samples;

generating a second feature input based on the first output;

inputting the first output into a second trained model to receive a second output, wherein the second output comprises a human-readable description of the labeled code sample, and wherein the second trained model generates descriptions related to the labeled code sample characteristics of the one or more of the plurality of labeled code samples identified by feature based on inputted second feature inputs; and generating for display, in the user interface, results corresponding to the request based on the second output.

18. The one or more non-transitory, computer-readable media of claim 17, wherein the inputting of the first output into the second trained model to receive the second output further comprises:

determining a first term in the labeled code sample;

selecting a second term from a standardized taxonomy for the datastore corresponding to the first term; and determining the human-readable description based on the second term.

19. The one or more non-transitory, computer-readable media of claim 17, wherein the inputting of the first output into the second trained model to receive the second output further comprises:

determining metadata describing the labeled code sample;

generating a prompt for the second trained model based on the first output and the metadata; and inputting the prompt into the second trained model.

20. The one or more non-transitory, computer-readable media of claim 17, wherein the inputting of the first output into the second trained model to receive the second output further comprises:

identifying a first portion and a second portion of the labeled code sample;

weighting the first portion and the second portion based on a first criterion to determine a first weighted portion and a second weighted portion; and determining the human-readable description based on the first weighted portion and the second weighted portion.

* * * * *